United States Patent
Cao et al.

(10) Patent No.: US 11,824,493 B2
(45) Date of Patent: Nov. 21, 2023

(54) PHOTOVOLTAIC MODULE AND PHOTOVOLTAIC SYSTEM

(71) Applicant: Huawei Digital Power Technologies Co., Ltd., Shenzhen (CN)

(72) Inventors: Zhen Cao, Shanghai (CN); Guilei Gu, Shanghai (CN); Su Zhou, Shenzhen (CN); Dong Chen, Shanghai (CN); Lei Shi, Shanghai (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/826,475

(22) Filed: May 27, 2022

(65) Prior Publication Data

US 2022/0385231 A1 Dec. 1, 2022

(30) Foreign Application Priority Data

May 31, 2021 (CN) .......................... 202110603345.6

(51) Int. Cl.
*H02S 40/32* (2014.01)
*H02S 40/36* (2014.01)
*H02S 40/34* (2014.01)

(52) U.S. Cl.
CPC .............. *H02S 40/36* (2014.12); *H02S 40/32* (2014.12); *H02S 40/34* (2014.12)

(58) Field of Classification Search
CPC ................... H01L 31/00–078; H02S 40/30–38
USPC .................................................. 136/243–265
See application file for complete search history.

(56) References Cited

U.S. PATENT DOCUMENTS

2004/0118446 A1   6/2004  Toyomura

FOREIGN PATENT DOCUMENTS

| CN | 101976855 A | 2/2011 |
|----|----|----|
| CN | 204119150 U | 1/2015 |
| CN | 104362971 A | 2/2015 |
| CN | 105763152 A | 7/2016 |
| CN | 106452352 A | 2/2017 |
| CN | 106817075 A | 6/2017 |
| CN | 107124139 A | 9/2017 |
| CN | 108110078 A | 6/2018 |
| CN | 207706121 U | 8/2018 |

(Continued)

OTHER PUBLICATIONS

CN-110460093 English (Year: 2019).*

*Primary Examiner* — Bach T Dinh
(74) *Attorney, Agent, or Firm* — Maier & Maier, PLLC

(57) ABSTRACT

A power converter box and at least one junction box are integrated on a backplane of the photovoltaic module as a whole, and there is a cable for connecting the power converter and the junction box. In this case, relative to the conventional technology in which a junction box is independent of a power converter, a length of a cable used when the junction box and the power converter box are taken as a whole is shorter than a length of a cable used in the conventional technology. In this case, compared with the conventional technology in which a cable is connected to an independently placed power converter, the power converter only needs to establish a connection relationship by using a solder ribbon, a circuit board cable, and the like with low costs, so that production costs are low.

6 Claims, 22 Drawing Sheets

(56) References Cited

FOREIGN PATENT DOCUMENTS

| | | | |
|---|---|---|---|
| CN | 109672404 A | 4/2019 | |
| CN | 110460093 A * | 11/2019 | ............. G05B 19/04 |
| CN | 111224391 A | 6/2020 | |
| CN | 213186034 U | 5/2021 | |
| KR | 101408855 B1 | 7/2014 | |
| KR | 1020170106596 A | 9/2017 | |
| WO | 2020014861 A1 | 1/2020 | |

\* cited by examiner

PHOTOVOLTAIC MODULE AND PHOTOVOLTAIC SYSTEM

CROSS-REFERENCE TO RELATED APPLICATION

This application claims priority to Chinese Patent Application No. 202110603345.6, filed on May 31, 2021, which is hereby incorporated by reference in its entirety.

TECHNICAL FIELD

The embodiments relate to the field of photovoltaic technologies, a photovoltaic module and a photovoltaic system.

BACKGROUND

A junction box is attached to a backplane of a solar cell panel (namely, a photovoltaic module), an outgoing line of a photovoltaic substring in the photovoltaic module is connected to an internal circuit in the junction box, and the junction box is connected to an external cable, so that power generated by the photovoltaic module is connected to an external circuit.

To resolve a mismatch problem of the photovoltaic module, the photovoltaic module transmits an output power to a photovoltaic power converter (which may be referred to as a power converter for short). An existing power converter may be an external type and the power converter and a junction box may need to be connected through an external cable. For example, for a product form of a photovoltaic module in the conventional technology, refer to FIG. 1. In FIG. 1, a three-split junction box that well matches a module slicing technology is used as an example. The photovoltaic module includes three junction boxes, and the three junction boxes are connected to a power converter through a cable as a whole.

In research and practice processes, overall production costs of a power converter and a junction box are high, and consequently, system costs of a photovoltaic system are also high. Therefore, how to reduce the overall production costs of the power converter and the junction box is currently a key research problem.

SUMMARY

The embodiments provide a photovoltaic module and a photovoltaic system, to reduce an external cable between a conventional power converter and a junction box and reduce production costs.

According to a first aspect, an embodiment provides a photovoltaic module. The photovoltaic module is applicable to a photovoltaic system and is coupled to an inverter in the photovoltaic system. The photovoltaic module includes at least two photovoltaic substrings, at least one power converter box, and at least one junction box, where the at least one photovoltaic substring includes a first photovoltaic substring and at least one second photovoltaic substring; the power converter box includes at least one power conversion module and a first group of connection terminals, and the power conversion module includes one group of input terminals and one group of output terminals; and the junction box includes a second group of connection terminals. In an implementation, the first group of connection terminals of the power converter box is coupled to output terminals of the first photovoltaic substring; and the second group of connection terminals of the junction box is coupled to output terminals of the second photovoltaic substring. Therefore, the first group of connection terminals of the power converter box and the second group of connection terminals of the junction box are coupled through a solder ribbon, and the output terminals of the first photovoltaic substring and the output terminals of the second photovoltaic substring can be coupled in series. If a port obtained after the output terminals of the first photovoltaic substring and the output terminals of the second photovoltaic substring are coupled in series is coupled to a first target connection terminal of the power converter box, the first target connection terminal of the power converter box is coupled to an input terminal of the power conversion module through a circuit board cable, where the first target connection terminal is any terminal of the first group of connection terminals of the power converter box; if a port obtained after the output terminals of the first photovoltaic substring and the output terminals of the second photovoltaic substring are coupled in series is coupled to a second target connection terminal of the junction box, the second target connection terminal of the junction box is coupled to an input terminal of the power conversion module through a first cable, where the second target connection terminal is any one or two terminals of the second group of connection terminals of the junction box; the input terminals of the power conversion module may receive a first power output after the output terminals of the first photovoltaic substring and the output terminals of the second photovoltaic substring are coupled in series; and output terminals of the power conversion module are coupled to an inverter through a second cable, to transmit a second power processed by the power conversion module to the inverter. In this embodiment, the power converter box and the junction box are integrated on a backplane of the photovoltaic module as a whole, and there is a cable for connecting the power converter box and the junction box. In the conventional technology, a junction box is independent of a power converter. In this embodiment, a length of a cable used when the junction box and the power converter box are taken as a whole is shorter than a length of a cable used in the conventional technology, so that an external cable between a conventional power converter and a junction box can be reduced, and overall production costs of the power converter and the junction box can be reduced.

With reference to the first aspect, in a first possible implementation, the power converter box further includes a first diode corresponding to the first photovoltaic substring and at least one second diode corresponding to the second photovoltaic substring, where the output terminals of the first photovoltaic substring and the output terminals of the second photovoltaic substring each include a positive output terminal and a negative output terminal; the positive output terminal of the first photovoltaic substring is coupled to a cathode of the first diode, and the negative output terminal of the first photovoltaic substring is coupled to an anode of the first diode; and the positive output terminal of the second photovoltaic substring is coupled to a cathode of the second diode, and the negative output terminal of the second photovoltaic substring is coupled to an anode of the second diode. In this embodiment, the diodes are all disposed in the power converter box instead of being disposed in the junction box. In this case, for the junction box, a heat dissipation problem does not need to be considered and sealant pouring processing does not need to be performed. The sealant pouring processing needs to be performed and the heat dissipation problem needs to be considered for only the power converter box. The production costs can be further reduced by implementing this embodiment.

With reference to the first aspect, in a second possible implementation, the power converter box further includes a first diode, and the junction box further includes a second diode, where the output terminals of the first photovoltaic substring and the output terminals of the second photovoltaic substring each include a positive output terminal and a negative output terminal; the positive output terminal of the first photovoltaic substring is coupled to a cathode of the first diode, and the negative output terminal of the first photovoltaic substring is coupled to an anode of the first diode; and the positive output terminal of the second photovoltaic substring is coupled to a cathode of the second diode, and the negative output terminal of the second photovoltaic substring is coupled to an anode of the second diode. In this embodiment, the output terminals of the first photovoltaic substring and the output terminals of the second photovoltaic substring each are connected in parallel to a diode in reverse directions, and the diodes can prevent some photovoltaic substrings from becoming loads of another photovoltaic substring and being damaged by heat emitting because the photovoltaic substrings have insufficient output voltages due to problems such as shielding. In other words, security of use of the photovoltaic module can be improved.

With reference to the first aspect, in a third possible implementation, the at least one power conversion module includes a plurality of power conversion modules corresponding to a plurality of photovoltaic substring groups. Each photovoltaic substring group includes any one or more of the photovoltaic substrings in the photovoltaic module; input terminals of each power conversion module are respectively coupled to output terminals of a photovoltaic substring group corresponding to the power conversion module, to process a power output by each photovoltaic substring group to obtain the second power; and output terminals of each power conversion module are coupled in series to the inverter. In this embodiment, a power conversion module corresponding to each photovoltaic substring may be disposed to implement substring-level MPPT, and the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, the security of the use of the photovoltaic module can be also improved.

With reference to the first aspect or any one of the foregoing possible implementations of the first aspect, in a fourth possible implementation, each photovoltaic substring includes two substring units connected in parallel, where a parallel point between the two substring units connected in parallel is an output terminal of the photovoltaic substring in which the two substring units connected in parallel are located. In this embodiment, a photovoltaic substring in the photovoltaic module is divided into two substring units connected in parallel, so that heat of the photovoltaic substring can be reduced when it is ensured that a same power is output by the photovoltaic module.

With reference to the first aspect or any one of the foregoing possible implementations of the first aspect, in a fifth possible implementation, the at least one junction box includes a first junction box and a second junction box, where the second group of connection terminals of each junction box includes a second positive connection terminal and a second negative connection terminal; the first group of connection terminals of the power converter box includes a first positive connection terminal and a first negative connection terminal; the group of input terminals of the power conversion module includes a positive input terminal and a negative input terminal; the solder ribbon includes a first solder ribbon and a second solder ribbon; and the first cable includes a first sub cable and a second sub cable. In an implementation, the second negative connection terminal of the first junction box is coupled to the first positive connection terminal of the power converter box through the first solder ribbon, and the first negative connection terminal of the power converter box is coupled to the second positive connection terminal of the second junction box through the second solder ribbon; and the second positive connection terminal of the first junction box is coupled to the positive input terminal of the power conversion module through the first sub cable, and the second negative connection terminal of the second junction box is coupled to the negative input terminal of the power conversion module through the second sub cable. In this embodiment, the first photovoltaic substring is placed between the two second photovoltaic substrings, that is, the power converter box is located between the two junction boxes, and a power transmission loss is low.

According to a second aspect, an embodiment provides a photovoltaic module. The photovoltaic module is applicable to a photovoltaic system and is coupled to an inverter in the photovoltaic system. The photovoltaic module includes at least two photovoltaic substrings and at least one power converter box, where the at least two photovoltaic strings include a first photovoltaic substring and at least one second photovoltaic substring; and the power converter box includes at least one power conversion module, a third group of connection terminals, and a fourth group of connection terminals, and the power conversion module includes one group of input terminals and one group of output terminals. In an implementation, the third group of connection terminals of the power converter box is coupled to output terminals of the first photovoltaic substring; and the fourth group of connection terminals of the power converter box is coupled to output terminals of the second photovoltaic substring. Therefore, the third group of connection terminals of the power converter box and the fourth group of connection terminals of the power converter box are coupled through a solder ribbon, and the output terminals of the first photovoltaic substring and the output terminals of the second photovoltaic substring can be coupled in series. If a port obtained after the output terminals of the first photovoltaic substring and the output terminals of the second photovoltaic substring are coupled in series is coupled to a third target connection terminal of the power converter box, the third target connection terminal of the power converter box is coupled to an input terminal of the power conversion module through a circuit board cable, where the third target connection terminal is any terminal of the third group of connection terminals of the power converter box; and if a port obtained after the output terminals of the first photovoltaic substring and the output terminals of the second photovoltaic substring are coupled in series is coupled to a fourth target connection terminal of the power converter box, the fourth target connection terminal of the power converter box is coupled to an input terminal of the power conversion module through a circuit board cable, where the fourth target connection terminal is any terminal of the fourth group of connection terminals of the power converter. The input terminals of the power conversion module may receive a first power output after the output terminals of the first photovoltaic substring and the output terminals of the second photovoltaic substring are coupled in series; and output terminals of the power conversion module are coupled to an inverter through a third cable, to transmit a second power processed by the power conversion module to the inverter. In this embodiment, only the power converter box is integrated on a backplane of the photovoltaic module. The third group of connection terminals and the fourth group of connection terminals in the power converter box can be coupled in series to the output terminals of all the photovoltaic substrings in the photovoltaic module through the solder ribbon, and the ports obtained after the output terminals of all the photovoltaic substrings in the photovoltaic module are coupled in series can be coupled to the input terminals of the power conversion module through the circuit board cables. The photovoltaic module in this embodiment has an MPPT function and does not need to be connected to an independently placed power converter through a cable compared with a conventional photovoltaic module. A new photovoltaic module may have low production costs and strong applicability by establishing a connection relationship by using a solder ribbon and a circuit board cable.

With reference to the second aspect, in a first possible implementation, the power converter box further includes a third diode corresponding to the first photovoltaic substring and at least one fourth diode corresponding to the at least one second photovoltaic substring, where the output terminals of each photovoltaic substring include a positive output terminal and a negative output terminal; the positive output terminal of the first photovoltaic substring is coupled to a cathode of the third diode, and the negative output terminal of the first photovoltaic substring is coupled to an anode of the third diode; and the positive output terminal of the second photovoltaic substring is coupled to a cathode of the fourth diode, and the negative output terminal of the second photovoltaic substring is coupled to an anode of the fourth diode. In this embodiment, the output terminals of the first photovoltaic substring and the output terminals of the second photovoltaic substring each are connected in parallel to a diode in reverse directions, and the diodes can prevent some photovoltaic substrings from becoming loads of another photovoltaic substring and being damaged by heat emitting because the photovoltaic substrings have insufficient output voltages due to problems such as shielding. In other words, security of use of the photovoltaic module can be improved.

With reference to the second aspect, in a second possible implementation, the at least one power conversion module includes a plurality of power conversion modules corresponding to a plurality of photovoltaic substring groups. Each photovoltaic substring group includes any one or more of the photovoltaic substrings in the photovoltaic module; input terminals of each power conversion module are respectively coupled to output terminals of a photovoltaic substring group corresponding to the power conversion module, to process a power output by each photovoltaic substring group to obtain the second power; and output terminals of each power conversion module are coupled in series to the inverter. In this embodiment, a power conversion module corresponding to each photovoltaic substring may be disposed to implement substring-level MPPT, and the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, security of use of the photovoltaic module can be improved.

With reference to the second aspect or any possible implementation of the second aspect, in a third possible implementation, each photovoltaic substring includes two substring units connected in parallel, where a parallel point between the two substring units connected in parallel is an output terminal of the photovoltaic substring in which the two substring units connected in parallel are located. In this embodiment, a photovoltaic substring in the photovoltaic module is divided into two substring units connected in parallel, so that heat of the photovoltaic substring can be reduced when it is ensured that a same power is output by the photovoltaic module. According to a third aspect, an embodiment provides a photovoltaic system. The photovoltaic system includes an inverter and the photovoltaic module described in any one of the first aspect or the possible implementations of the first aspect. The inverter may convert a direct current output by the photovoltaic module into an alternating current.

According to a third aspect, an embodiment provides a photovoltaic system. The photovoltaic system includes an inverter and the photovoltaic module described in any one of the first aspect or the possible implementations of the first aspect. The inverter may convert a direct current output by the photovoltaic module into an alternating current.

According to a fourth aspect, an embodiment provides a photovoltaic system. The photovoltaic system includes an inverter and the photovoltaic module described in any one of the second aspect or the possible implementations of the second aspect. The inverter may convert a direct current output by the photovoltaic module into an alternating current.

It should be understood that implementation and beneficial effects of the foregoing aspects may be referred to each other.

DETAILED DESCRIPTION OF THE EMBODIMENTS

The following describes the solutions in the embodiments with reference to the accompanying drawings. The described embodiments are some but not all of embodiments. All other embodiments obtained by a person of ordinary skill in the art without creative efforts shall fall within the scope of the embodiments.

A photovoltaic module may be applicable to a photovoltaic system, and the photovoltaic module may be coupled to an inverter in the photovoltaic system.

It should be noted that "coupling" indicates direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C.

For example, a switch, a power distribution cabinet, and the like may be disposed between the photovoltaic module and the inverter.

Figure 1:
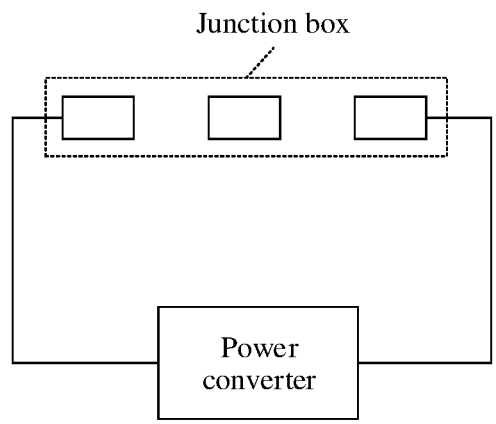
FIG. 1 is a schematic diagram of a product form of a photovoltaic module in the conventional technology.
Figure 2:
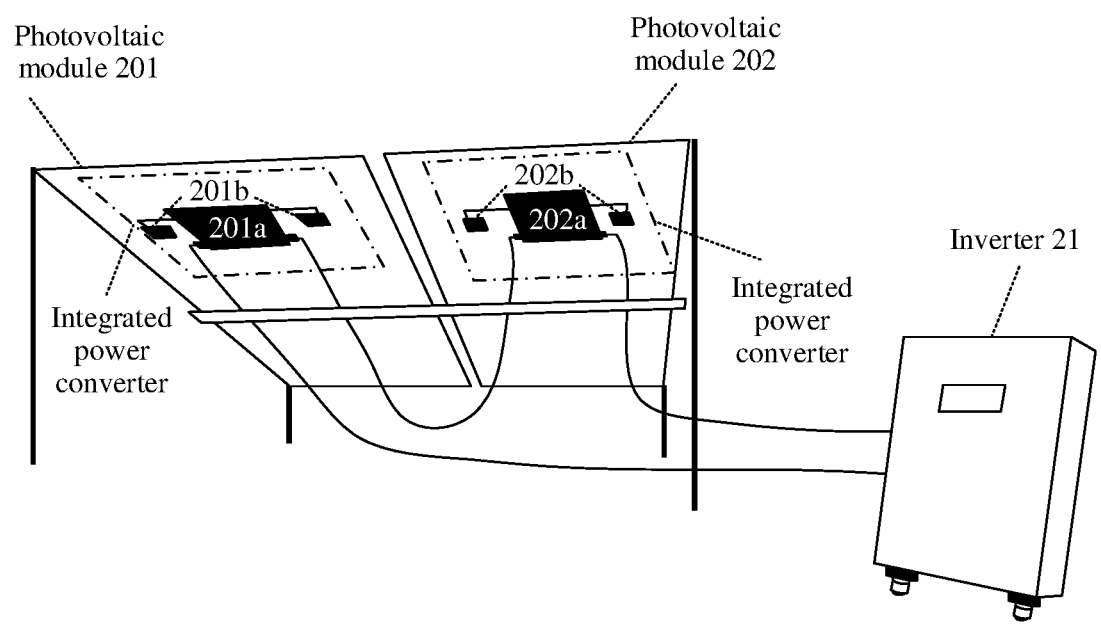
FIG. 2 is a block diagram of a structure of a photovoltaic system according to an embodiment.

In some feasible implementations, FIG. 2 is a block diagram of a structure of a photovoltaic system according to an embodiment. As shown in FIG. 2, the photovoltaic system includes at least one photovoltaic module (for example, a photovoltaic module 201 and a photovoltaic module 202) and an inverter 21.

For example, the photovoltaic modules may be connected in series to form a photovoltaic module array, to be coupled to the inverter 21. For example, the photovoltaic module 201 and the photovoltaic module 202 are coupled to the inverter 21 after being connected in series, to output a direct current to the inverter 21, and the inverter 21 may convert the direct current into an alternating current. It should be understood that the photovoltaic modules may be alternatively connected in parallel to form a photovoltaic module array, and the photovoltaic system may include a plurality of photovoltaic module arrays. A quantity and a connection manner of photovoltaic modules in the photovoltaic system are not limited.

An integrated power converter is disposed on a backplane of the photovoltaic module 201 shown in FIG. 2, and the integrated power converter includes a power converter box 201a and a junction box 201b. In addition, an integrated power converter may be disposed on a backplane of the photovoltaic module 202, and the integrated power converter includes a power converter box 202a and a junction box 202b. In an implementation, a negative output terminal of the power converter box 201a may be coupled to a positive output terminal of the power converter box 202a, and an output terminal of the photovoltaic module 201 may be coupled in series to an output terminal of the photovoltaic module 202, where a positive output terminal of the power converter box 201a and a negative output terminal of the power converter box 202a are coupled to the inverter 21. Alternatively, a positive output terminal of the power converter box 201a may be coupled to a negative output terminal of the power converter box 202a, and an output terminal of the photovoltaic module 201 may be coupled in series to an output terminal of the photovoltaic module 202, where a negative output terminal of the power converter box 201a and a positive output terminal of the power converter box 202a are coupled to the inverter 21.

It should be understood that a quantity of junction boxes 202b integrated on a backplane of a photovoltaic module 202 is related to a quantity of photovoltaic substrings of the photovoltaic module 202. In FIG. 2, that each photovoltaic module 202 includes three photovoltaic substrings is used as an example. In this case, two junction boxes 202b are integrated on a backplane of the photovoltaic module 202. If a photovoltaic module 202 includes N photovoltaic substrings, only N−1 junction boxes 202b and one power converter box 202a need to be integrated on a backplane of the photovoltaic module 202, where N is an integer greater than 1.

In some feasible implementations, a power converter box in each integrated power converter includes at least one power conversion module and a first group of connection terminals. The first group of connection terminals of the power converter box may be coupled to output terminals of a first photovoltaic substring corresponding to the power converter box, and a second group of connection terminals of a junction box is coupled to output terminals of a second photovoltaic substring corresponding to the junction box. The first group of connection terminals of the power converter box and the second group of connection terminals of the junction box are coupled through a solder ribbon, so that the output terminals of the photovoltaic substrings in the photovoltaic module can be coupled in series. A port obtained after the output terminals of the photovoltaic substrings in the photovoltaic module are coupled in series can be coupled to an input terminal of the power conversion module through a circuit board cable and/or a first cable, so that the power conversion module can perform maximum power point tracking (MPPT) on a power output after the photovoltaic substrings are coupled in series, and transmit a power obtained after the MPPT processing to the inverter 21.

In the conventional technology, a junction box is externally hung on a power converter of a photovoltaic module through a cable connection. However, in this embodiment, a power converter box and a junction box may be taken as a whole (which may be referred to as an integrated power converter), and the integrated power converter may be disposed on a backplane of a photovoltaic module. There is a cable connection between the power converter box and the junction box in the integrated power converter. In the conventional technology, the junction box is independent of the power converter. In this embodiment, a length of a cable used when the junction box and the power converter box are taken as a whole is shorter than a length of a cable used in the conventional technology, so that an external cable between a conventional power converter and a junction box can be reduced, and overall production costs of the power converter and the junction box can be reduced. In addition, the cable is manufactured by a manufacturer that manufactures the integrated power converter or a manufacturer of the photovoltaic module and does not need to be operated by a user. For the user, the cable only needs to be connected from an output terminal of the integrated power converter to the inverter, and an operation is simple. In addition, solder ribbon cabling inside the photovoltaic module in the conventional technology is not affected.

Figure 3:
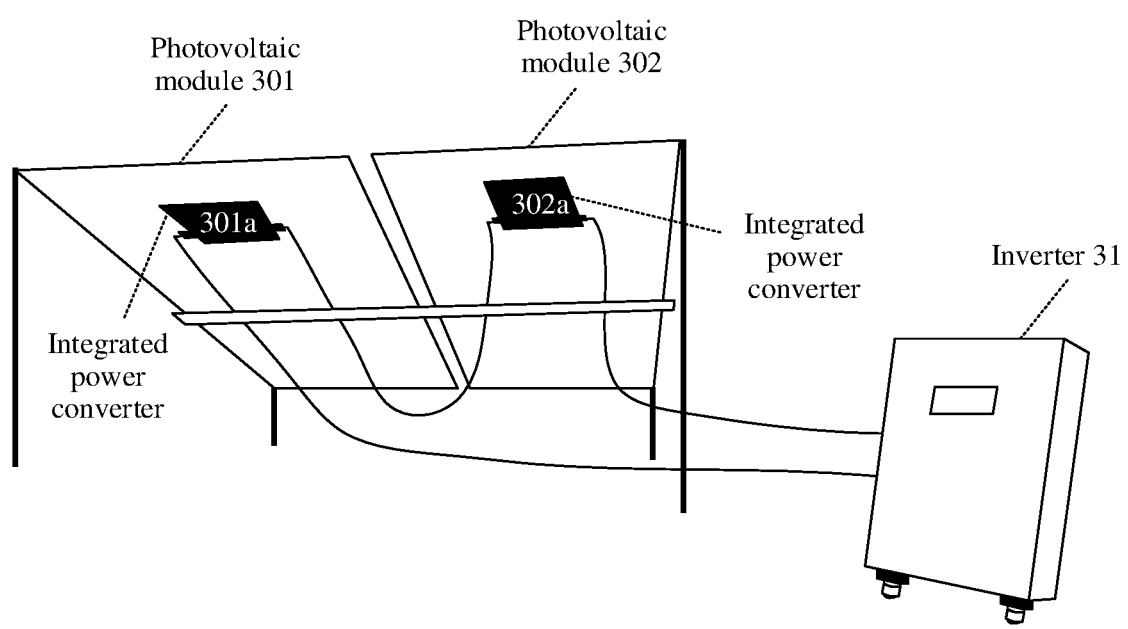
FIG. 3 is a block diagram of another structure of a photovoltaic system according to an embodiment.

Optionally, in some feasible implementations, FIG. 3 is a block diagram of another structure of a photovoltaic system according to an embodiment. As shown in FIG. 3, the photovoltaic system includes at least one photovoltaic module (for example, a photovoltaic module 301 and a photovoltaic module 302) and an inverter 31.

For example, the photovoltaic modules may be connected in series to form a photovoltaic module array, to be coupled to the inverter 31. For example, the photovoltaic module 301 and the photovoltaic module 302 are coupled to the inverter 31 after being connected in series, to provide a direct current to the inverter 31, and the inverter 31 may convert the direct current into an alternating current. It should be understood that the photovoltaic modules may be alternatively connected in parallel to form a photovoltaic module array, and the photovoltaic system may include a plurality of photovoltaic module arrays. A quantity and a connection manner of photovoltaic modules in the photovoltaic system are not limited.

An integrated power converter (namely, a power converter box 301a) is disposed on a backplane of the photovoltaic module 301 shown in FIG. 3, and an integrated power converter (namely, a power converter box 302a) is disposed on a backplane of the photovoltaic module 302. In an implementation, a negative output terminal of the power converter box 301a may be connected to a positive output terminal of the power converter box 302a, and an output terminal of the photovoltaic module 301 may be coupled in series to an output terminal of the photovoltaic module 302, where a positive output terminal of the power converter box 301a and a negative output terminal of the power converter box 302a are coupled to the inverter 31. Alternatively, a positive output terminal of the power converter box 301a may be connected to a negative output terminal of the power converter box 302a, and an output terminal of the photovoltaic module 301 may be coupled in series to an output terminal of the photovoltaic module 302, where a negative output terminal of the power converter box 301a and a positive output terminal of the power converter box 302a are coupled to the inverter 31.

A difference between the photovoltaic system shown in FIG. 3 and the photovoltaic system shown in FIG. 2 lies in that a backplane of each photovoltaic module in the photovoltaic system shown in FIG. 3 is integrated with only a power converter box, and no junction box is integrated.

In some feasible implementations, each power converter box includes at least one power conversion module, a third group of connection terminals, and a fourth group of connection terminals. The third group of connection terminals of the power converter box may be coupled to output terminals of a first photovoltaic substring; and the fourth group of connection terminals of the power converter box is coupled to output terminals of a second photovoltaic substring. The third group of connection terminals and the fourth group of connection terminals of the power converter box are coupled through a solder ribbon, so that the output terminals of the photovoltaic substrings in the photovoltaic module in which the power converter box is located can be coupled in series. A port obtained after the output terminals of the photovoltaic substrings in the photovoltaic module are coupled in series is coupled to an input terminal of the power conversion module through a circuit board cable, so that the power conversion module can perform MPPT on a power output after the photovoltaic substrings are coupled in series, and transmit a power obtained after the MPPT processing to the inverter 31.

In this embodiment, only the power converter box is integrated on a backplane of the photovoltaic module. The third group of connection terminals and the fourth group of connection terminals in the power converter box can be coupled in series to the output terminals of all the photovoltaic substrings in the photovoltaic module through the solder ribbon, and the ports obtained after the output terminals of all the photovoltaic substrings in the photovoltaic module are coupled in series can be coupled to the input terminals of the power conversion module through the circuit board cables. The photovoltaic module in this embodiment has an MPPT function, and a connection relationship between the connection terminal and the power conversion module is established by using a solder ribbon, a circuit board cable, and the like with low costs, so that production costs are low and applicability is strong.

Optionally, the power converter box may not have the foregoing MPPT function but has a shutdown function. When operation of a photovoltaic substring is abnormal, a connection between the photovoltaic substring and the photovoltaic system may be cut off, to prevent the photovoltaic substring from affecting operation of the photovoltaic system. In this case, the power conversion module included in the power converter box may be understood as a shutdown device.

The following describes in detail the photovoltaic module shown in FIG. 2 with reference to FIG. 4 to FIG. 8.

Figure 4:
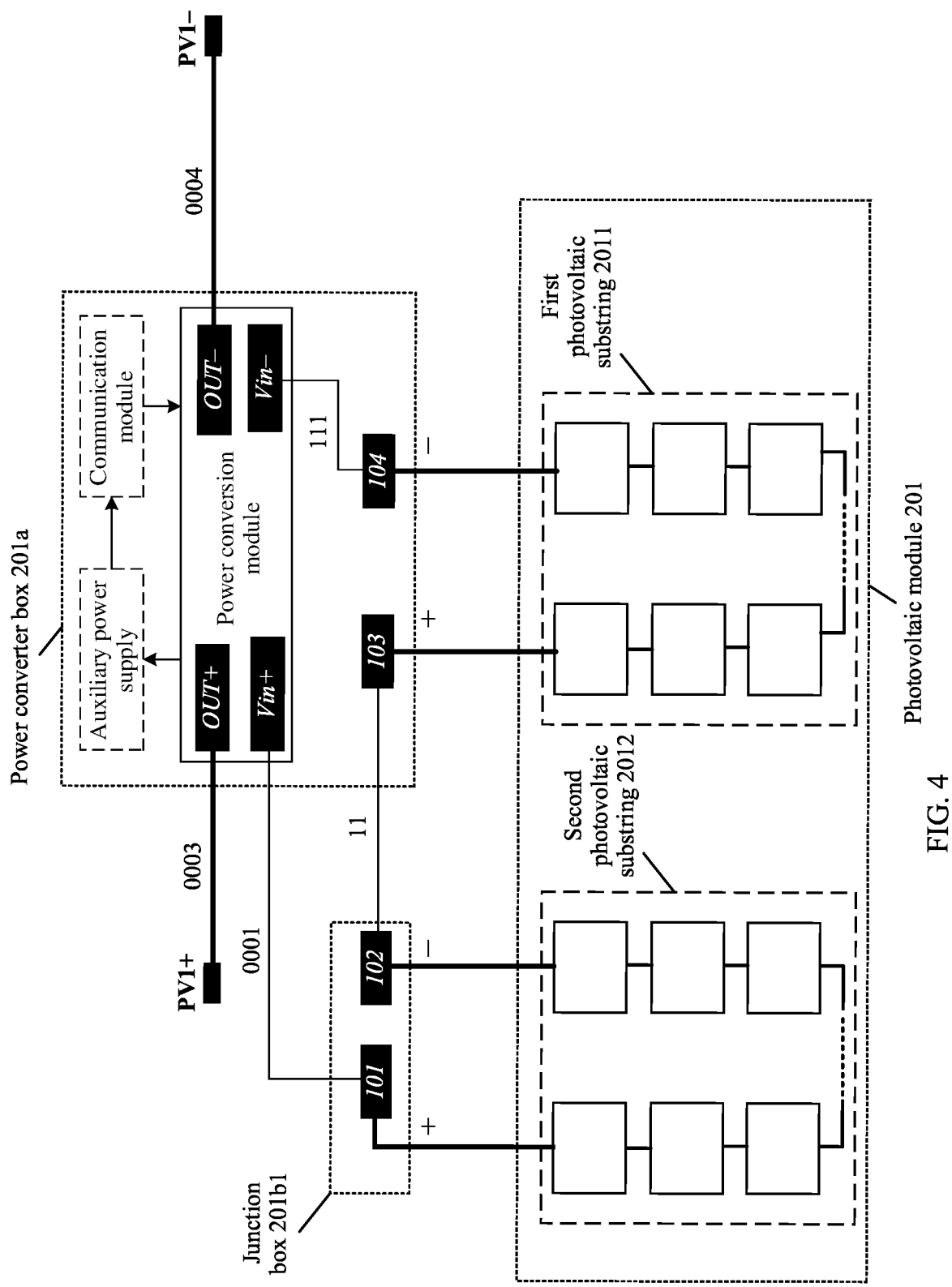
FIG. 4 is a block diagrams of a structure of a photovoltaic module according to an embodiment.

In some feasible implementations, FIG. 4 is a block diagram of a structure of a photovoltaic module according to an embodiment. As shown in FIG. 4, the photovoltaic module 201 includes two photovoltaic substrings (for example, a first photovoltaic substring 2011 and a second photovoltaic substring 2012), at least one power converter box (for example, a power converter box 201a), and at least one junction box (for example, a junction box 201b1).

The power converter box 201a includes a first group of connection terminals, and the first group of connection terminals is coupled to output terminals of the first photovoltaic substring 2011. The junction box 201b1 includes a second group of connection terminals, and the second group of connection terminals is coupled to output terminals of the second photovoltaic substring 2012. The first group of connection terminals of the power converter box 201a and the second group of connection terminals of the junction box 201b1 are coupled through a solder ribbon 11. In this case, the output terminals of the first photovoltaic substring 2011 and the output terminals of the second photovoltaic substring 2012 can be coupled in series.

For example, a positive output terminal of the first photovoltaic substring 2011 is coupled to a first positive connection terminal 103 of the power converter box 201a, and a negative output terminal of the first photovoltaic substring 2011 is coupled to a first negative connection terminal 104 of the power converter box 201a; and a positive output terminal of the second photovoltaic substring 2012 is coupled to a second positive connection terminal 101 of the junction box 201b1, and a negative output terminal of the second photovoltaic substring 2012 is coupled to a second negative connection terminal 102 of the junction box 201b1. In this case, the second negative connection terminal 102 of the junction box 201b1 is coupled to the first positive connection terminal 103 of the power converter box 201a through the solder ribbon 11, that is, the output terminals of the first photovoltaic substring 2011 and the output terminals of the second photovoltaic substring 2012 are coupled in series. In other words, after output terminals of a photovoltaic substring are coupled to connection terminals of a corresponding power converter box or connection terminals of a corresponding junction box, a series relationship between adjacent photovoltaic substrings can be established by using a solder ribbon.

The power converter box 201a further includes at least one power conversion module. In FIG. 4, that the power converter box 201a includes one power conversion module is used as an example. The power conversion module includes one group of input terminals and one group of output terminals. The input terminals of the power conversion module may receive a first power output after the output terminals of the first photovoltaic substring 2011 and the output terminals of the second photovoltaic substring 2012 are coupled in series.

The group of input terminals of the power conversion module includes a positive input terminal Vin+ and a negative input terminal Vin−.

A negative port (namely, the negative output terminal of the first photovoltaic substring 2011) obtained after the output terminals of the first photovoltaic substring 2011 and the output terminals of the second photovoltaic substring 2012 are coupled in series is coupled to a first target connection terminal (namely, the first negative connection terminal 104 of the power converter box 201a) of the power converter box 201a. In this case, the first negative connection terminal 104 of the power converter box 201a is coupled to the negative input terminal Vin− of the power conversion module through a circuit board cable 111. In addition, a positive port (namely, the positive output terminal of the second photovoltaic substring 2012) obtained after the output terminals of the first photovoltaic substring 2011 and the output terminals of the second photovoltaic substring 2012 are coupled in series is coupled to a second target connection terminal (namely, the second positive connection terminal 101 of the junction box 201b1) of the junction box 201b1. In this case, the second positive connection terminal 101 of the junction box 201b1 is coupled to the positive input terminal Vin+ of the power conversion module through a first cable 0001.

Figure 5:
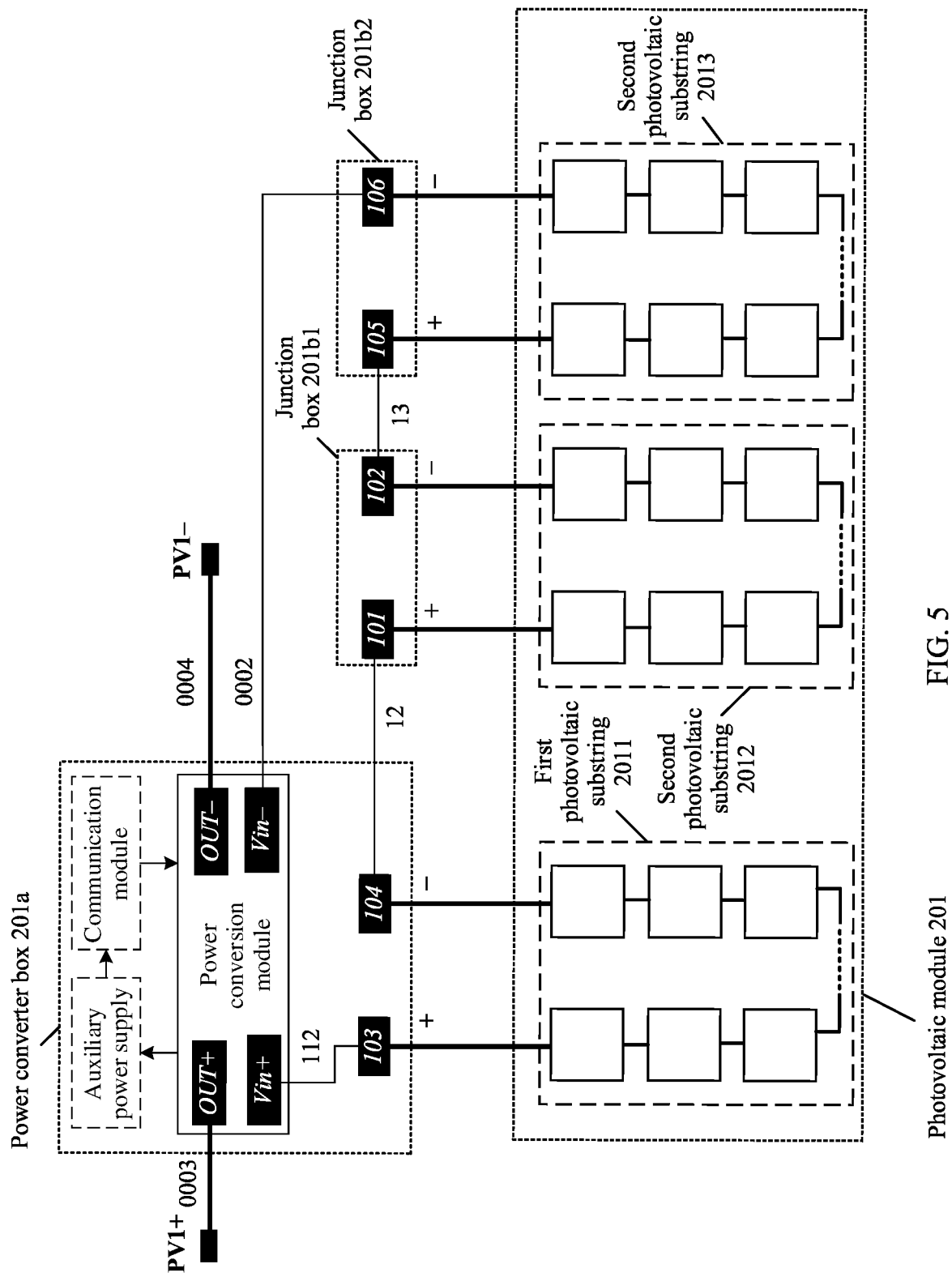
FIG. 5 is a block diagrams of a structure of a photovoltaic module according to an embodiment.

Optionally, in some feasible implementations, FIG. 5 is a block diagram of another structure of a photovoltaic module according to an embodiment. As shown in FIG. 5, a difference between this embodiment and the photovoltaic module shown in FIG. 4 lies in that this embodiment includes three photovoltaic substrings, for example, a first photovoltaic substring 2011, a second photovoltaic substring 2012, and a second photovoltaic substring 2013.

In an implementation, output terminals of the first photovoltaic substring 2011 are coupled to a first group of connection terminals of a power converter box 201a, output terminals of the second photovoltaic substring 2012 are coupled to a second group of connection terminals of a junction box 201b1, and output terminals of the second photovoltaic substring 2013 are coupled to a second group of connection terminals of a junction box 201b2. A first negative connection terminal 104 of the power converter box 201a is coupled to a second positive connection terminal 101 of the junction box 201b1 through a solder ribbon 12, and a second negative connection terminal 102 of the junction box 201b1 is coupled to a second positive connection terminal 105 of the junction box 201b2 through a solder ribbon 13. In this case, the output terminals of the first photovoltaic substring 2011, the output terminals of the second photovoltaic substring 2012, and the output terminals of the second photovoltaic substring 2013 can be coupled in series.

For example, a negative port (namely, a negative output terminal of the second photovoltaic substring 2013) obtained after the output terminals of the first photovoltaic substring 2011, the output terminals of the second photovoltaic substring 2012, and the output terminals of the second photovoltaic substring 2013 are coupled in series is coupled to a second target connection terminal (namely, a second negative connection terminal 106 of the junction box 201b2) of the junction box 201b2. In this case, the second negative connection terminal 106 of the junction box 201b2 is coupled to a negative input terminal Vin− of a power conversion module through a first cable 0002. A positive port (namely, a positive output terminal of the first photovoltaic substring 2011) obtained after the output terminals of the first photovoltaic substring 2011, the output terminals of the second photovoltaic substring 2012, and the output terminals of the second photovoltaic substring 2013 are coupled in series is coupled to a first target connection terminal (namely, a first positive connection terminal 103 of the power converter box 201a) of the power converter box 201a. In this case, the first positive connection terminal 103 of the power converter box 201a is coupled to a positive input terminal Vin+ of the power conversion module through a circuit board cable 112.

Figure 6:
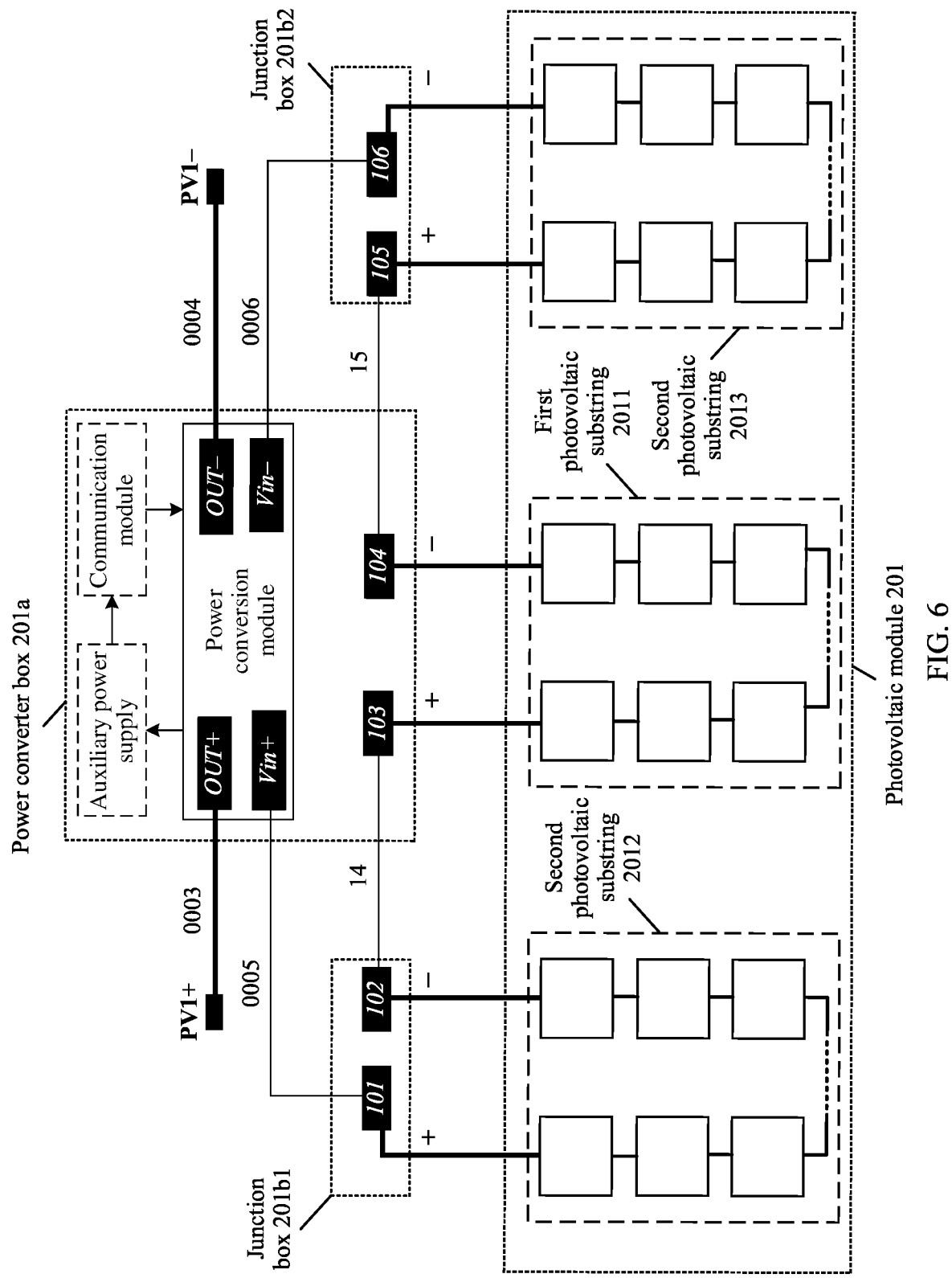
FIG. 6 is a block diagrams of a structure of a photovoltaic module according to an embodiment.

Optionally, in some feasible implementations, FIG. 6 is a block diagram of another structure of a photovoltaic module according to an embodiment. A difference between the photovoltaic module shown in FIG. 6 and the photovoltaic module shown in FIG. 5 lies in that a first photovoltaic substring 2011 is located between second photovoltaic substrings in a photovoltaic module 201, that is, the first photovoltaic substring 2011 is located between a second photovoltaic substring 2012 and a second photovoltaic substring 2013.

In an implementation, output terminals of the first photovoltaic substring 2011 are coupled to a first group of connection terminals of a power converter box 201a, output terminals of the second photovoltaic substring 2012 are coupled to a second group of connection terminals of a junction box 201b1, and output terminals of the second photovoltaic substring 2013 are coupled to a second group of connection terminals of a junction box 201b2. A second negative connection terminal 102 of the junction box 201b1 is coupled to a first positive connection terminal 103 of the power converter box 201a through a first solder ribbon 14, and a first negative connection terminal 104 of the power converter box 201a is coupled to a second positive connection terminal 105 of the junction box 201b2 through a second solder ribbon 15. In this case, the output terminals of the first photovoltaic substring 2011, the output terminals of the second photovoltaic substring 2012, and the output terminals of the second photovoltaic substring 2013 can be coupled in series.

A positive port (namely, a positive output terminal of the second photovoltaic substring 2012) obtained after the output terminals of the first photovoltaic substring 2011, the output terminals of the second photovoltaic substring 2012, and the output terminals of the second photovoltaic substring 2013 are coupled in series is coupled to a second target connection terminal (namely, a second positive connection terminal 101 of the junction box 201b1) of the junction box 201b1. In this case, the second positive connection terminal 101 of the junction box 201b1 is coupled to a positive input terminal Vin+ of a power conversion module through a first sub cable 0005. A negative port (namely, a negative output terminal of the second photovoltaic substring 2013) obtained after the output terminals of the first photovoltaic substring 2011, the output terminals of the second photovoltaic substring 2012, and the output terminals of the second photovoltaic substring 2013 are coupled in series is coupled to a second target connection terminal (namely, a second negative connection terminal 106 of the junction box 201*b*2) of the junction box 201*b*2. In this case, the second negative connection terminal 106 of the junction box 201*b*2 is coupled to a negative input terminal Vin− of the power conversion module through a second sub cable 0006.

For example, the junction box 201*b*1 may be understood as a first junction box, and the junction box 201*b*2 may be understood as a second junction box.

Optionally, the first solder ribbon 14 and the second solder ribbon 15 are located on a same horizontal line, so that space utilization of the photovoltaic module can be improved.

Relative to the embodiment described in FIG. 5, in this embodiment, the first photovoltaic substring is placed between the two second photovoltaic substrings, that is, the power converter box is located between the two junction boxes, and a power transmission loss is low.

It should be noted that relative positions of the photovoltaic substrings are different, so that an interconnection relationship among the substrings can be changed. The relative positions of the photovoltaic substrings are not limited, provided that the photovoltaic substrings can be coupled in series.

In addition, the photovoltaic module may include at least two photovoltaic substrings. Use of either two photovoltaic substrings or three photovoltaic substrings is merely used as an example for description. It should be understood that the photovoltaic module in the embodiments may alternatively include four photovoltaic substrings, five photovoltaic substrings, or the like. A quantity of photovoltaic substrings is not limited.

Figure 7:
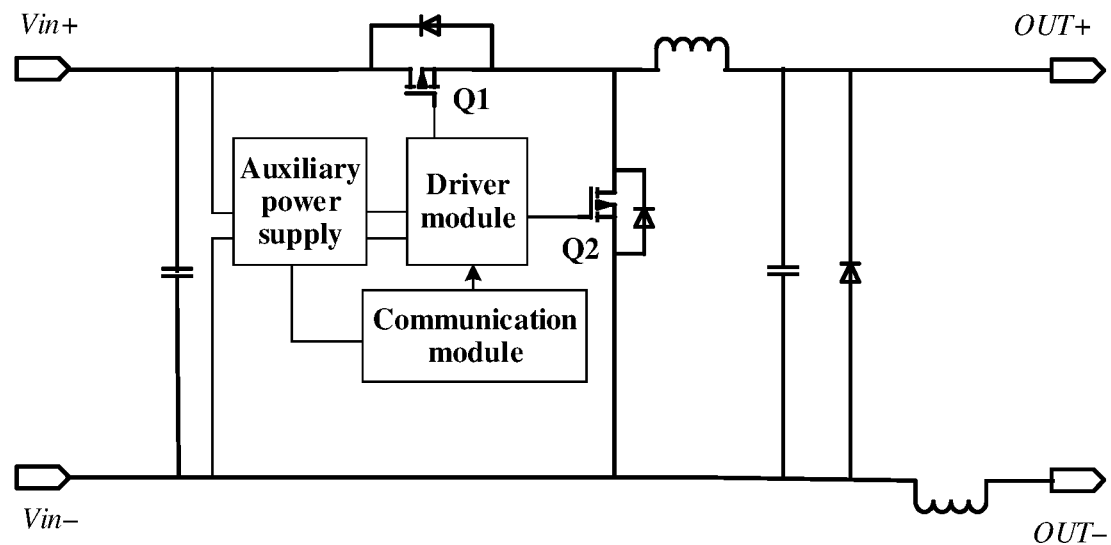
FIG. 7 is a circuit diagram of a power conversion module according to an embodiment.

In some feasible implementations, FIG. 7 is a circuit diagram of a power conversion module according to an embodiment. As shown in FIG. 7, the power conversion module may be implemented by using a BUCK circuit. The power conversion module controls on duration of each of a switching transistor Q1 and a switching transistor Q2 by using a driver module, to control a voltage between output terminals of the power conversion module. Optionally, the power conversion module may alternatively be another DC/DC conversion circuit, for example, any one of a BOOST circuit or a BUCK-BOOST circuit.

Optionally, the driver module may be disposed in a power optimization chip in the power conversion module or a drive chip may be separately disposed. A position of disposing the driver module is not limited.

Optionally, in some feasible implementations, an auxiliary power supply of the power conversion module may be an energy storage battery (for example, a nickel-cadmium battery, a nickel-metal hydride battery, a lithium ion battery, or a lithium polymer battery), a solar cell, or the like. The auxiliary power supply may alternatively be an output voltage of a photovoltaic module. An implementation of the auxiliary power supply is not limited in this embodiment.

For example, the power conversion module may perform MPPT processing on a power output after a first photovoltaic substring and a second photovoltaic substring are connected in series (namely, a photovoltaic module 201), and transmit a processed power to an inverter 21. In an implementation, the output terminals of the power conversion module are coupled to the inverter 21 through a second cable. For example, a positive output terminal OUT+ of the power conversion module (namely, a positive output terminal PV1+ of the photovoltaic module 201) is coupled to a positive input terminal of the inverter 21 through a second cable 0003, and a negative output terminal OUT− of the power conversion module (namely, a negative output terminal PV1− of the photovoltaic module 201) is coupled to a negative input terminal of the inverter 21 through a second cable 0004.

This embodiment may be an implementation of saving an external cable between a conventional power converter and a junction box. The power converter box and the junction box are integrated on a backplane of the photovoltaic module as a whole, and there is a cable connection between the power converter box and the junction box in the integrated power converter. In the conventional technology, a junction box is independent of a power converter. In this embodiment, a length of a cable used when the junction box and the power converter box are taken as a whole is shorter than a length of a cable used in the conventional technology, so that the external cable between the conventional power converter and the junction box can be reduced, and overall production costs of the power converter and the junction box can be reduced. The photovoltaic module in this embodiment has an MPPT function and does not need to be connected to an independently placed power converter through a cable compared with a conventional photovoltaic module, providing a new photovoltaic module with low production costs and strong applicability.

Figure 8:
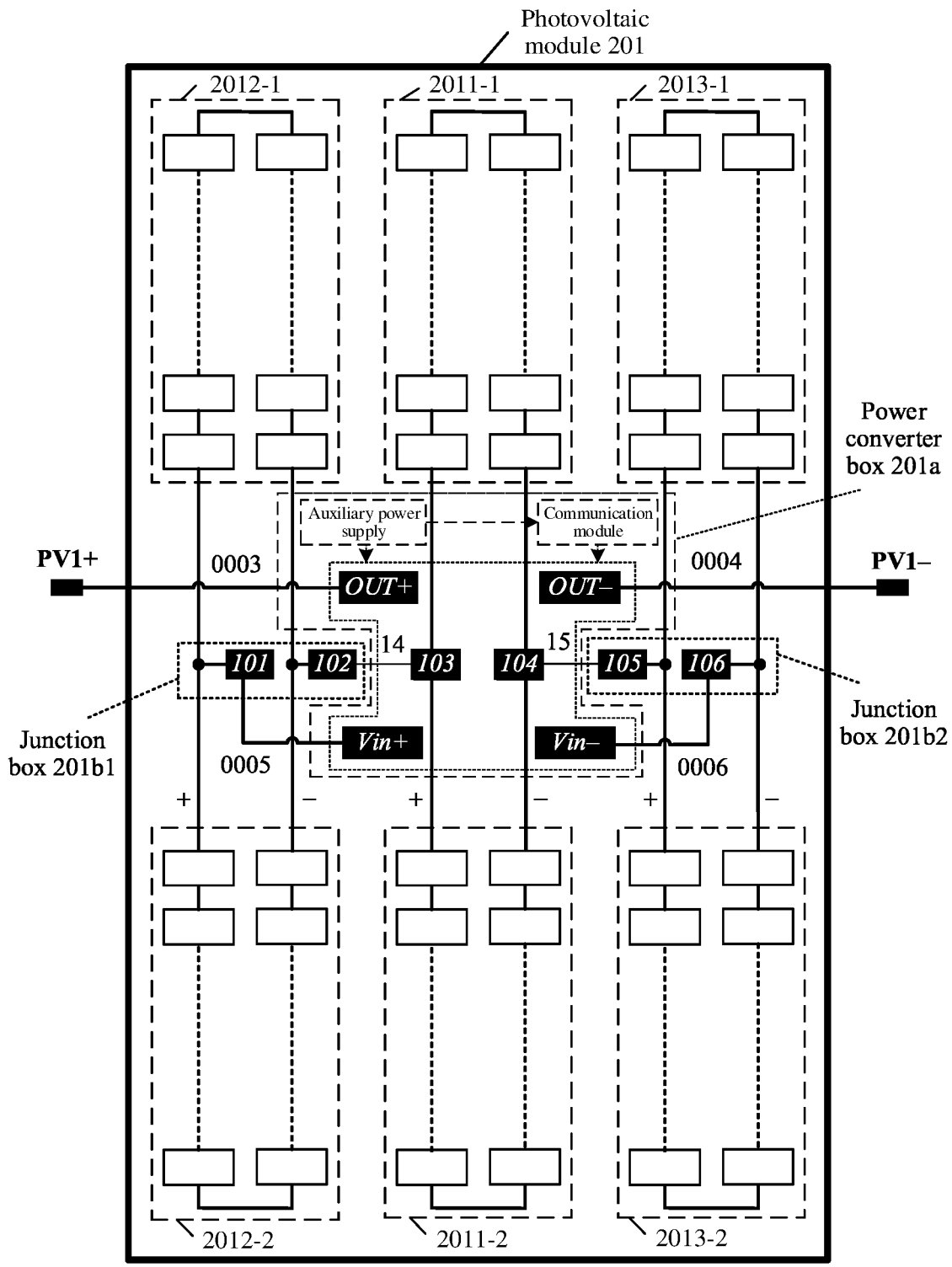
FIG. 8 is a block diagram of another structure of a photovoltaic module according to an embodiment.

In some feasible implementations, FIG. 8 is a block diagram of another structure of a photovoltaic module according to an embodiment. As shown in FIG. 8, each photovoltaic substring in the photovoltaic module 201 includes two substring units connected in parallel, where a parallel point between the two substring units connected in parallel is an output terminal of the photovoltaic substring in which the two substring units connected in parallel are located.

In FIG. 8, that each photovoltaic substring in the photovoltaic module shown in FIG. 6 includes two substring units connected in parallel is used as an example. As shown in FIG. 8, the first photovoltaic substring 2011 includes a substring unit 2011-1 and a substring unit 2011-2, and a parallel point between the substring unit 2011-1 and the substring unit 2011-2 is an output terminal of the first photovoltaic substring 2011. The second photovoltaic substring 2012 includes a substring unit 2012-1 and a substring unit 2012-2, and a parallel point between the substring unit 2012-1 and the substring unit 2012-2 is an output terminal of the second photovoltaic substring 2012. The second photovoltaic substring 2013 includes a substring unit 2013-1 and a substring unit 2013-2, and a parallel point between the substring unit 2013-1 and the substring unit 2013-2 is an output terminal of the second photovoltaic substring 2013.

In an implementation, a positive output terminal of the substring unit 2011-1 and a positive output terminal of the substring unit 2011-2 are connected in parallel, and are coupled to the first positive connection terminal 103 of the power converter box 201*a*; and a negative output terminal of the substring unit 2011-1 and a negative output terminal of the substring unit 2011-2 are connected in parallel, and are coupled to the first negative connection terminal 104 of the power converter box 201*a*. A positive output terminal of the substring unit 2012-1 and a positive output terminal of the substring unit 2012-2 are connected in parallel, and are coupled to the second positive connection terminal 101 of the junction box 201*b*1; and a negative output terminal of the substring unit 2012-1 and a negative output terminal of the substring unit 2012-2 are connected in parallel, and are coupled to the second negative connection terminal 102 of the junction box 201b1. A positive output terminal of the substring unit 2013-1 and a positive output terminal of the substring unit 2013-2 are connected in parallel, and are coupled to the second positive connection terminal 105 of the junction box 201b2; and a negative output terminal of the substring unit 2013-1 and a negative output terminal of the substring unit 2013-2 are connected in parallel, and are coupled to the second negative connection terminal 106 of the junction box 201b2.

As described above with reference to FIG. 6, the second negative connection terminal 102 of the junction box 201b1 is coupled to the first positive connection terminal 103 of the power converter box 201a through the first solder ribbon 14, and the first negative connection terminal 104 of the power converter box 201a is coupled to the second positive connection terminal 105 of the junction box 201b2 through the second solder ribbon 15. In this case, the output terminals of the first photovoltaic substring 2011, the output terminals of the second photovoltaic substring 2012, and the output terminals of the second photovoltaic substring 2013 can be coupled in series. The second positive connection terminal 101 of the junction box 201b1 is coupled to the positive input terminal Vin+ of the power conversion module through the first sub cable 0005, and the second negative connection terminal 106 of the junction box 201b2 is coupled to the negative input terminal Vin− of the power conversion module through the second sub cable 0006. In this case, a first power output after the output terminals of the first photovoltaic substring 2011, the output terminals of the second photovoltaic substring 2012, and the output terminals of the second photovoltaic substring 2013 are coupled in series can be transmitted to the input terminals of the power conversion module.

A positive output terminal OUT+ of the power conversion module (namely, a positive output terminal PV1+ of the photovoltaic module 201) is coupled to a positive input terminal of an inverter through a second cable 0003, and a negative output terminal OUT− of the power conversion module (namely, a negative output terminal PV1− of the photovoltaic module 201) is coupled to a negative input terminal of the inverter through a second cable 0004. In this case, the output terminals of the power conversion module can transmit the second power processed by the power conversion module to the inverter 21.

In this embodiment, a photovoltaic substring in the photovoltaic module is divided into two substring units connected in parallel, so that heat of the photovoltaic substring can be reduced when it is ensured that a same power is output by the photovoltaic module.

The following describes, with reference to FIGS. 9A to FIG. 11C and with examples, the power converter box and the junction box described in FIGS. 4 to FIG. 6.

Figure 9A:
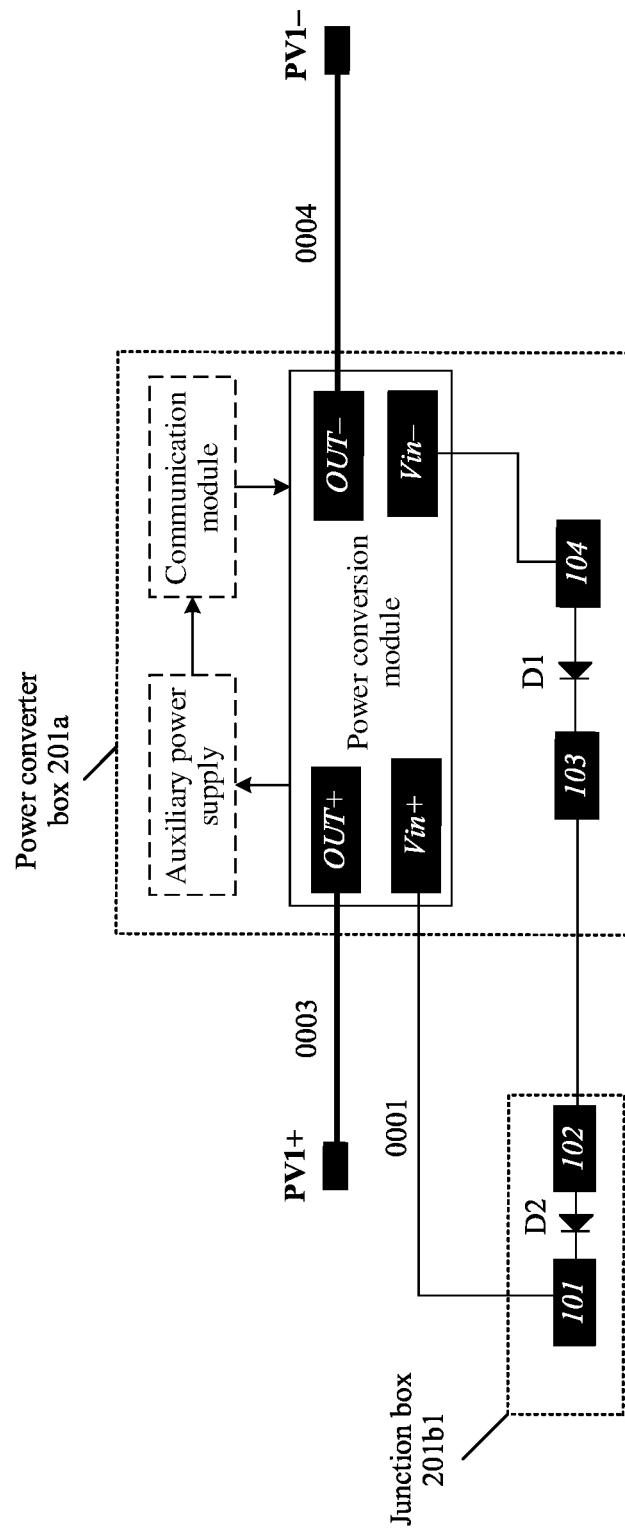
FIGS. 9A to FIG. 9C are block diagrams of internal structures of a power converter box and a junction box according to an embodiment.

In some feasible implementations, for an internal block diagram of the power converter box 201a and the junction box 201b1 shown in FIG. 4, refer to FIG. 9A. As shown in FIG. 9A, the power converter box 201a further includes a first diode D1; and the junction box 201b1 includes a second diode D2.

The first diode D1 disposed in the power converter box 201a is connected in parallel between the first positive connection terminal 103 and the first negative connection terminal 104 in reverse directions. In an implementation, a cathode of the first diode D1 is coupled to the first positive connection terminal 103 (that is, the cathode of the first diode D1 is coupled to the positive output terminal of the first photovoltaic substring 2011), and an anode of the first diode D1 is coupled to the first negative connection terminal 104 (the anode of the first diode D1 is coupled to the negative output terminal of the first photovoltaic substring 2011).

The second diode D2 disposed in the junction box 201b1 is connected in parallel between the second positive connection terminal 101 and the second negative connection terminal 102 of the junction box 201b1 in reverse directions. In an implementation, an anode of the second diode D2 is coupled to the second negative connection terminal 102 (the anode of the second diode D2 is coupled to the negative output terminal of the second photovoltaic substring 2012), and a cathode of the second diode D2 is coupled to the second positive connection terminal 101 (that is, the cathode of the second diode D2 is coupled to the positive output terminal of the second photovoltaic substring 2012). In this embodiment, the output terminals of the first photovoltaic substring and the output terminals of the second photovoltaic substring each are connected in parallel to a diode in reverse directions, and the diodes can prevent some photovoltaic substrings from becoming loads of another photovoltaic substring and being damaged by heat emitting because the photovoltaic substrings have insufficient output voltages due to problems such as shielding. In other words, security of use of the photovoltaic module can be improved.

Figure 9B:
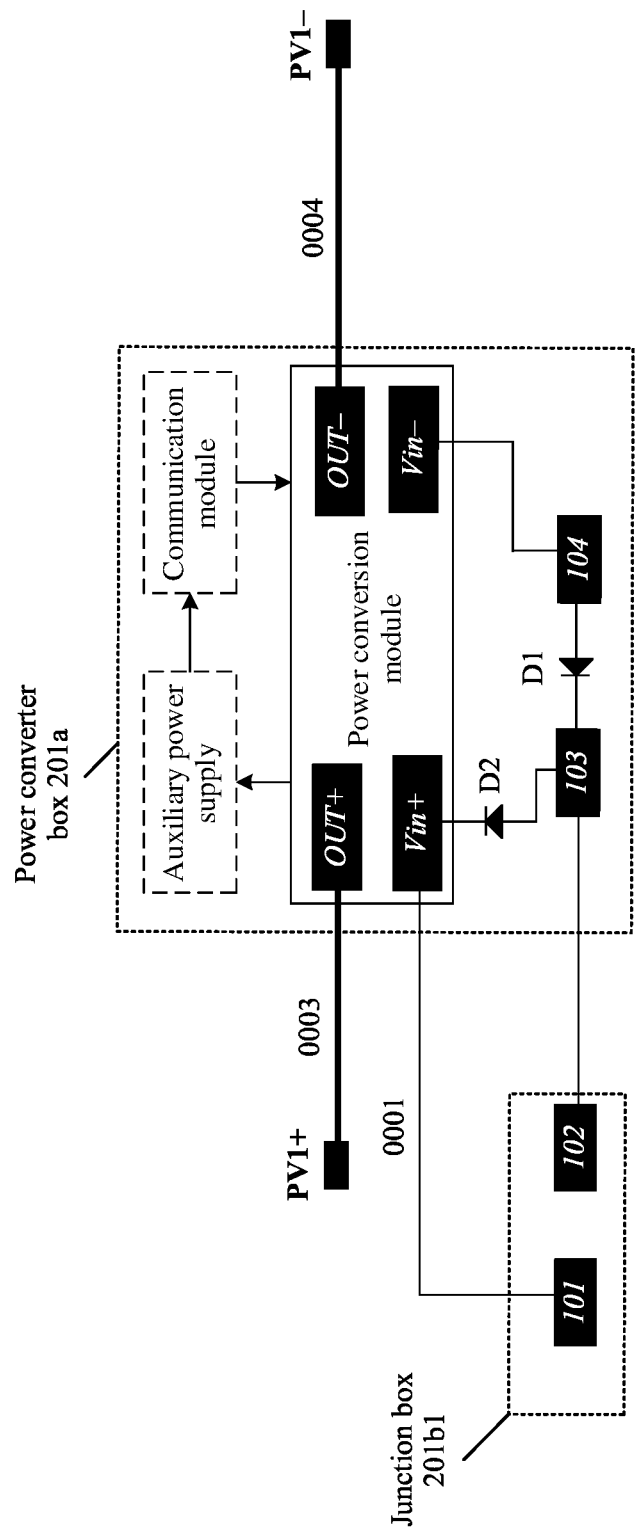

Optionally, in some feasible implementations, for an internal block diagram of the power converter box 201a and the junction box 201b1 shown in FIG. 4, alternatively refer to FIG. 9B. A difference between FIG. 9B and FIG. 9A lies in that the diodes are respectively disposed in the power converter box and the junction box in FIG. 9A, but the diodes are all disposed in the power converter box 201a in FIG. 9B.

As shown in FIG. 9B, the power converter box 201a further includes a first diode D1 corresponding to the first photovoltaic substring 2011 and a second diode D2 corresponding to the second photovoltaic substring 2012.

The first diode D1 is connected in parallel between the first positive connection terminal 103 and the first negative connection terminal 104 of the power converter box 201a in reverse directions, and the second diode D2 is connected in parallel between the positive input terminal Vin+ of the power conversion module and the first positive connection terminal 103 in reverse directions. In an implementation, a cathode of the first diode D1 is coupled to the first positive connection terminal 103 (that is, the cathode of the first diode D1 is coupled to the positive output terminal of the first photovoltaic substring 2011), and an anode of the first diode D1 is coupled to the first negative connection terminal 104 (that is, the anode of the first diode D1 is coupled to the negative output terminal of the first photovoltaic substring 2011). A cathode of the second diode D2 is coupled to the positive input terminal Vin+ of the power conversion module (that is, the cathode of the second diode D2 is coupled to the positive output terminal of the second photovoltaic substring 2012), and an anode of the second diode D2 is coupled to the first positive connection terminal 103 (that is, the anode of the second diode D2 is coupled to the negative output terminal of the second photovoltaic substring 2012).

In this embodiment, the diodes are all disposed in the power converter box instead of being disposed in the junction box. In this case, for the junction box, a heat dissipation problem does not need to be considered and sealant pouring processing does not need to be performed, and the sealant pouring processing needs to be performed and the heat dissipation problem needs to be considered for only the power converter box. The production costs can be further reduced by implementing this embodiment.

Figure 9C:
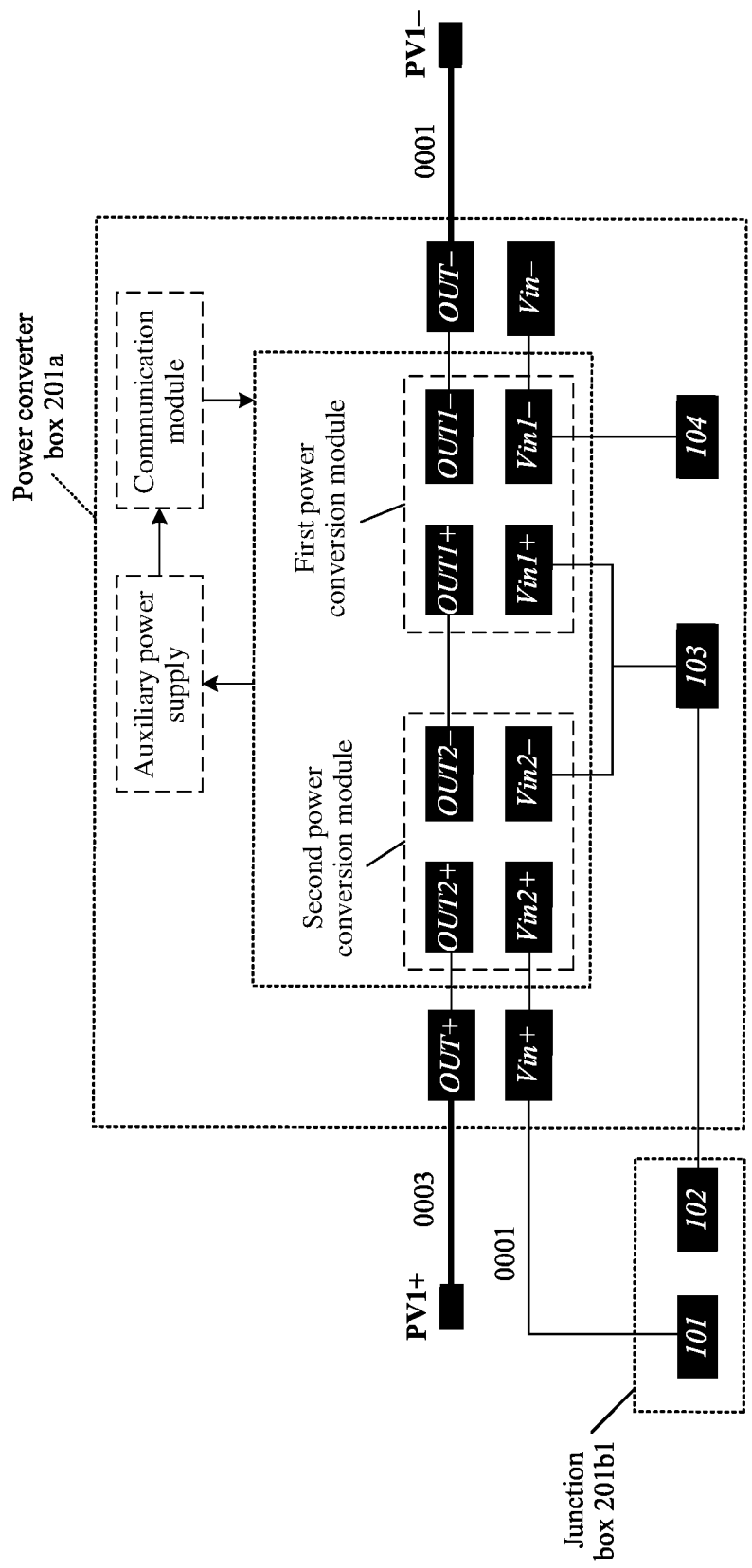

Optionally, in some feasible implementations, for an internal block diagram of the power converter box 201a and the junction box 201b1 shown in FIG. 4, alternatively refer to FIG. 9C. As shown in FIG. 9C, the power converter box 201a includes a first power conversion module and a second power conversion module.

The first power conversion module corresponds to the first photovoltaic substring 2011. The positive output terminal of the first photovoltaic substring 2011 is coupled to the first positive connection terminal 103 of the power converter box 201a, and the first positive connection terminal 103 may be coupled to a positive input terminal Vin1+ of the first power conversion module through a circuit board cable. The negative output terminal of the first photovoltaic substring 2011 is coupled to the first negative connection terminal 104 of the power converter box 201a, and the first negative connection terminal 104 may be coupled to a negative input terminal Vin1− of the first power conversion module through a circuit board cable. In this case, the first power conversion module can perform MPPT on the first photovoltaic substring 2011.

The second power conversion module corresponds to the second photovoltaic substring 2012. The positive output terminal of the second photovoltaic substring 2012 is coupled to the second positive connection terminal 101 of the junction box 201b1, where the second positive connection terminal 101 is coupled to a terminal Vin+ through the first cable 0001, and the terminal Vin+ may be coupled to a positive input terminal Vin2+ of the second power conversion module through a circuit board cable, that is, the positive output terminal of the second photovoltaic substring 2012 is coupled to the positive input terminal Vin2+ of the second power conversion module. The negative output terminal of the second photovoltaic substring 2012 is coupled to the second negative connection terminal 102 of the junction box 201b1, where the second negative connection terminal 102 is coupled to the first positive connection terminal 103 of the power converter box 201a through a solder ribbon, and the first positive connection terminal 103 is coupled to a negative input terminal Vin2− of the second power conversion module, that is, the negative output terminal of the second photovoltaic substring 2012 is coupled to the negative input terminal Vin2− of the second power conversion module. In this case, the second power conversion module can perform MPPT on the second photovoltaic substring 2012.

A negative output terminal OUT2− of the second power conversion module is coupled to a positive output terminal OUT1+ of the first power conversion module. In this case, output terminals of the first power conversion module and output terminals of the second power conversion module are coupled in series, and two terminals obtained after the output terminals of the first power conversion module and the output terminals of the second power conversion module are coupled in series are respectively a positive output terminal OUT2+ of the second power conversion module and a negative output terminal OUT1− of the first power conversion module. For example, the positive output terminal OUT2+ of the second power conversion module is coupled to a terminal OUT+ through a circuit board cable, and the terminal OUT+ (namely, the positive output terminal PV1+ of the photovoltaic module 201) is coupled to a positive input terminal of the inverter 21 through a second cable 0003; and the negative output terminal OUT1− of the first power conversion module is coupled to a terminal OUT−, and the terminal OUT− (namely, the negative output terminal PV1− of the photovoltaic module 201) is coupled to a negative input terminal of the inverter 21.

In this embodiment, a power conversion module corresponding to each photovoltaic substring may be disposed to implement substring-level MPPT, and a difference between this embodiment and both FIG. 9A and FIG. 9B lies in that the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, the security of the use of the photovoltaic module can be also improved.

Figure 10:
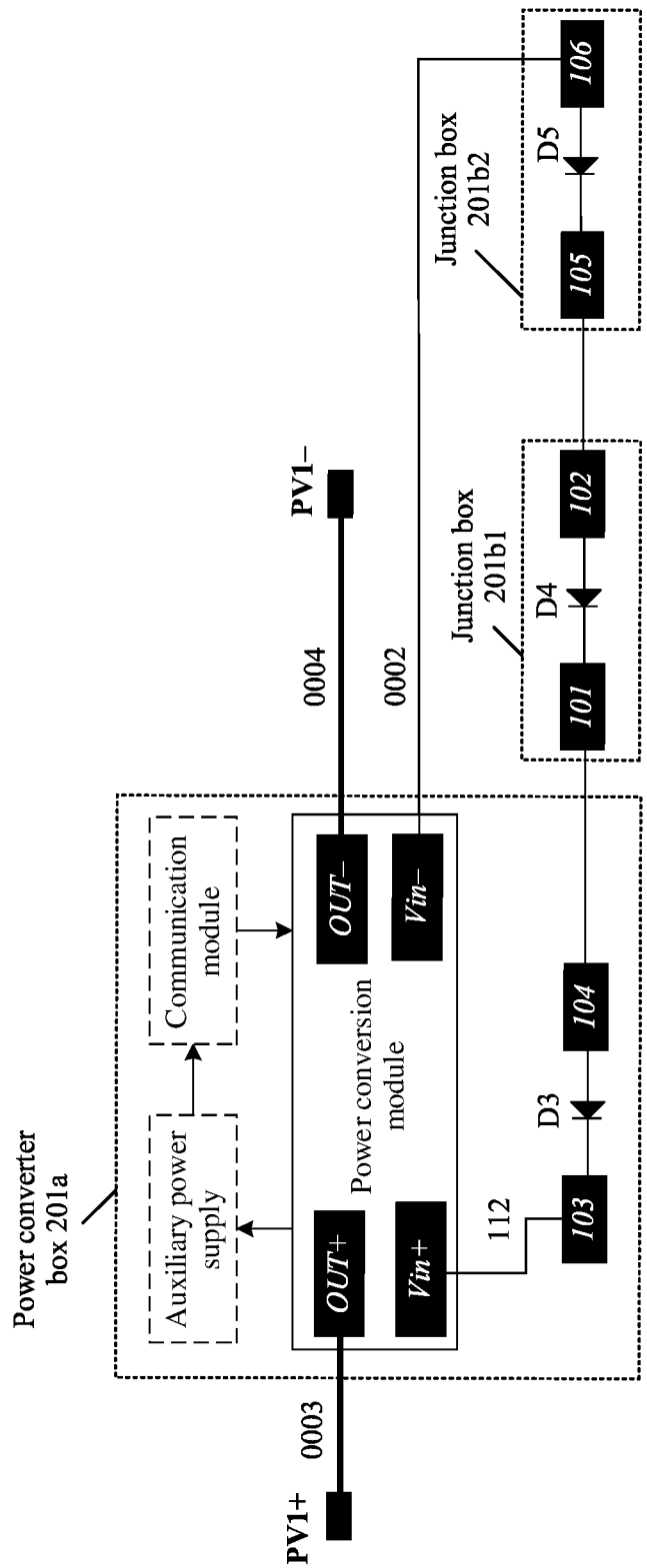
FIG. 10 is another block diagram of an internal structure of a power converter box and a junction box according to an embodiment.

In some feasible implementations, for an internal block diagram of the power converter box 201a and the junction boxes 201b1 and 201b2 shown in FIG. 5, refer to FIG. 10. As shown in FIG. 10, the power converter box 201a further includes a first diode D3; and the junction box 201b1 includes a second diode D4, and the junction box 201b2 includes a second diode D5.

The first diode D3 disposed in the power converter box 201a is connected in parallel between the first positive connection terminal 103 and the first negative connection terminal 104 in reverse directions. In an implementation, a cathode of the first diode D3 is coupled to the first positive connection terminal 103 (that is, the cathode of the first diode D3 is coupled to the positive output terminal of the first photovoltaic substring 2011), and an anode of the first diode D3 is coupled to the first negative connection terminal 104 (that is, the anode of the first diode D3 is coupled to the negative output terminal of the first photovoltaic substring 2011).

The second diode D4 disposed in the junction box 201b1 is connected in parallel between the second positive connection terminal 101 and the second negative connection terminal 102 in reverse directions. In an implementation, a cathode of the second diode D4 is coupled to the second positive connection terminal 101 (that is, the cathode of the second diode D4 is coupled to the positive output terminal of the second photovoltaic substring 2012), and an anode of the second diode D4 is coupled to the second negative connection terminal 102 (that is, the anode of the second diode D4 is coupled to the negative output terminal of the second photovoltaic substring 2012).

The second diode D5 disposed in the junction box 201b2 is connected in parallel between the second positive connection terminal 105 and the second negative connection terminal 106 in reverse directions. In an implementation, a cathode of the second diode D5 is coupled to the second positive connection terminal 105 (that is, the cathode of the second diode D5 is coupled to the positive output terminal of the second photovoltaic substring 2013), and an anode of the second diode D5 is coupled to the second negative connection terminal 106 (that is, the anode of the second diode D5 is coupled to the negative output terminal of the second photovoltaic substring 2013).

Figure 11A:
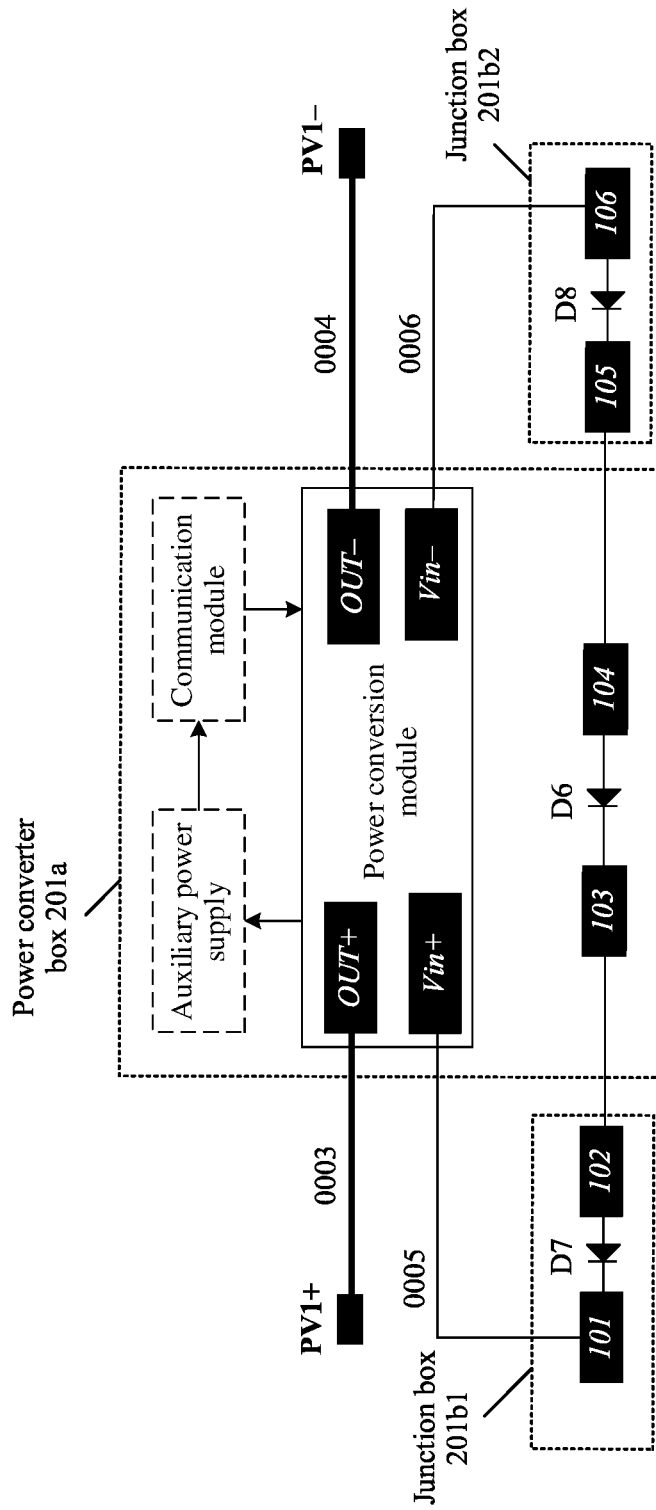
FIGS. 11A to FIG. 11C are block diagrams of internal structures of a power converter box and a junction box according to an embodiment.

In some feasible implementations, for an internal block diagram of the power converter box 201a and the junction boxes 201b1 and 201b2 shown in FIG. 6, refer to FIG. 11A. As shown in FIG. 11A, the power converter box 201a further includes a first diode D6; and the junction box 201b1 includes a second diode D7, and the junction box 201b2 includes a second diode D8.

The first diode D6 disposed in the power converter box 201a is connected in parallel between the first positive connection terminal 103 and the first negative connection terminal 104 in reverse directions. In an implementation, a cathode of the first diode D6 is coupled to the first positive connection terminal 103 (that is, the cathode of the first diode D6 is coupled to the positive output terminal of the first photovoltaic substring 2011), and an anode of the first diode D6 is coupled to the first negative connection terminal 104 (that is, the anode of the first diode D6 is coupled to the negative output terminal of the first photovoltaic substring 2011).

The second diode D7 disposed in the junction box 201b1 is connected in parallel between the second positive connection terminal 101 and the second negative connection terminal 102 in reverse directions. In an implementation, a cathode of the second diode D7 is coupled to the second positive connection terminal 101 (that is, the cathode of the second diode D7 is coupled to the positive output terminal of the second photovoltaic substring 2012), and an anode of the second diode D7 is coupled to the second negative connection terminal 102 (that is, the anode of the second diode D7 is coupled to the negative output terminal of the second photovoltaic substring 2012).

The second diode D8 disposed in the junction box 201b2 is connected in parallel between the second positive connection terminal 105 and the second negative connection terminal 106 in reverse directions. In an implementation, a cathode of the second diode D8 is coupled to the second positive connection terminal 105 (that is, the cathode of the second diode D8 is coupled to the positive output terminal of the second photovoltaic substring 2013), and an anode of the second diode D8 is coupled to the second negative connection terminal 106 (that is, the anode of the second diode D8 is coupled to the negative output terminal of the second photovoltaic substring 2013).

It may be understood that internal block diagrams of the power converter and the junction boxes in FIG. 11A and FIG. 10 may be understood as the same. However, relative positions of the power converter and the junction boxes are different because relative positions of the photovoltaic substrings respectively corresponding to the power converter and the junction boxes are different. The relative positions of the power converter box and the junction boxes are not limited.

Figure 11B:
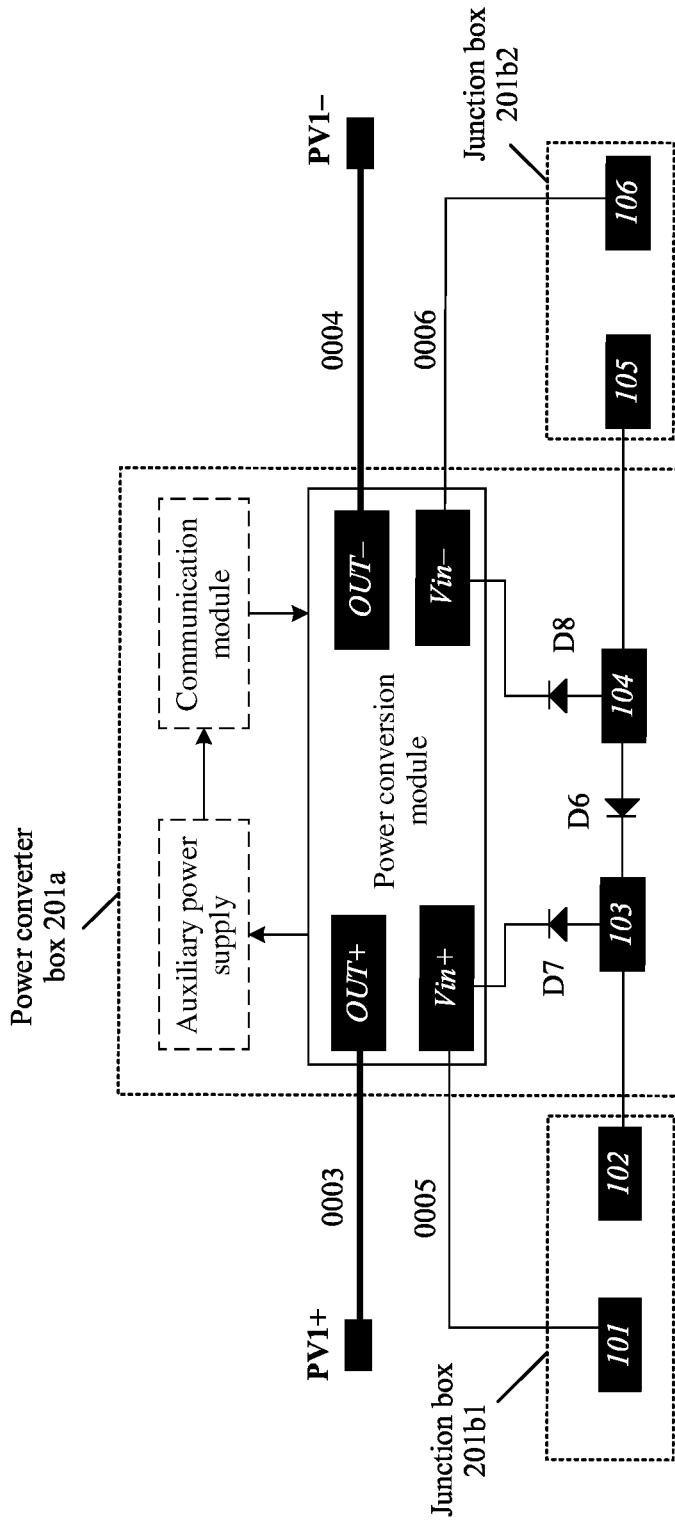

Optionally, in some feasible implementations, for an internal block diagram of the power converter box 201a and the junction boxes 201b1 and 201b2 shown in FIG. 6, alternatively refer to FIG. 11B. As shown in FIG. 11B, the power converter box 201a further includes a first diode D6 corresponding to the first photovoltaic substring 2011, a second diode D7 corresponding to the second photovoltaic substring 2012, and a second diode D8 corresponding to the second photovoltaic substring 2013.

The first diode D6 may be connected in parallel between the first positive connection terminal 103 and the first negative connection terminal 104 in reverse directions. In an implementation, a cathode of the first diode D6 is coupled to the first positive connection terminal 103 (that is, the cathode of the first diode D6 is coupled to the positive output terminal of the first photovoltaic substring 2011), and an anode of the first diode D6 is coupled to the first negative connection terminal 104 (that is, the anode of the first diode D6 is coupled to the negative output terminal of the first photovoltaic substring 2011).

The second diode D7 may be connected in parallel between the positive input terminal Vin+ of the power conversion module and the first positive connection terminal 103 in reverse directions. In an implementation, a cathode of the second diode D7 is coupled to the positive input terminal Vin+ of the power conversion module (that is, the cathode of the second diode D7 is coupled to the positive output terminal of the second photovoltaic substring 2012), and an anode of the second diode D7 is coupled to the first positive connection terminal 103 (that is, the anode of the second diode D7 is coupled to the negative output terminal of the second photovoltaic substring 2012).

The second diode D8 may be connected in parallel between the negative input terminal Vin+ of the power conversion module and the first negative connection terminal 104 in reverse directions. In an implementation, a cathode of the second diode D8 is coupled to the negative input terminal Vin− of the power conversion module (that is, the cathode of the second diode D8 is coupled to the positive output terminal of the second photovoltaic substring 2013), and an anode of the second diode D8 is coupled to the second negative connection terminal 104 (that is, the anode of the second diode D8 is coupled to the negative output terminal of the second photovoltaic substring 2013).

Figure 11C:
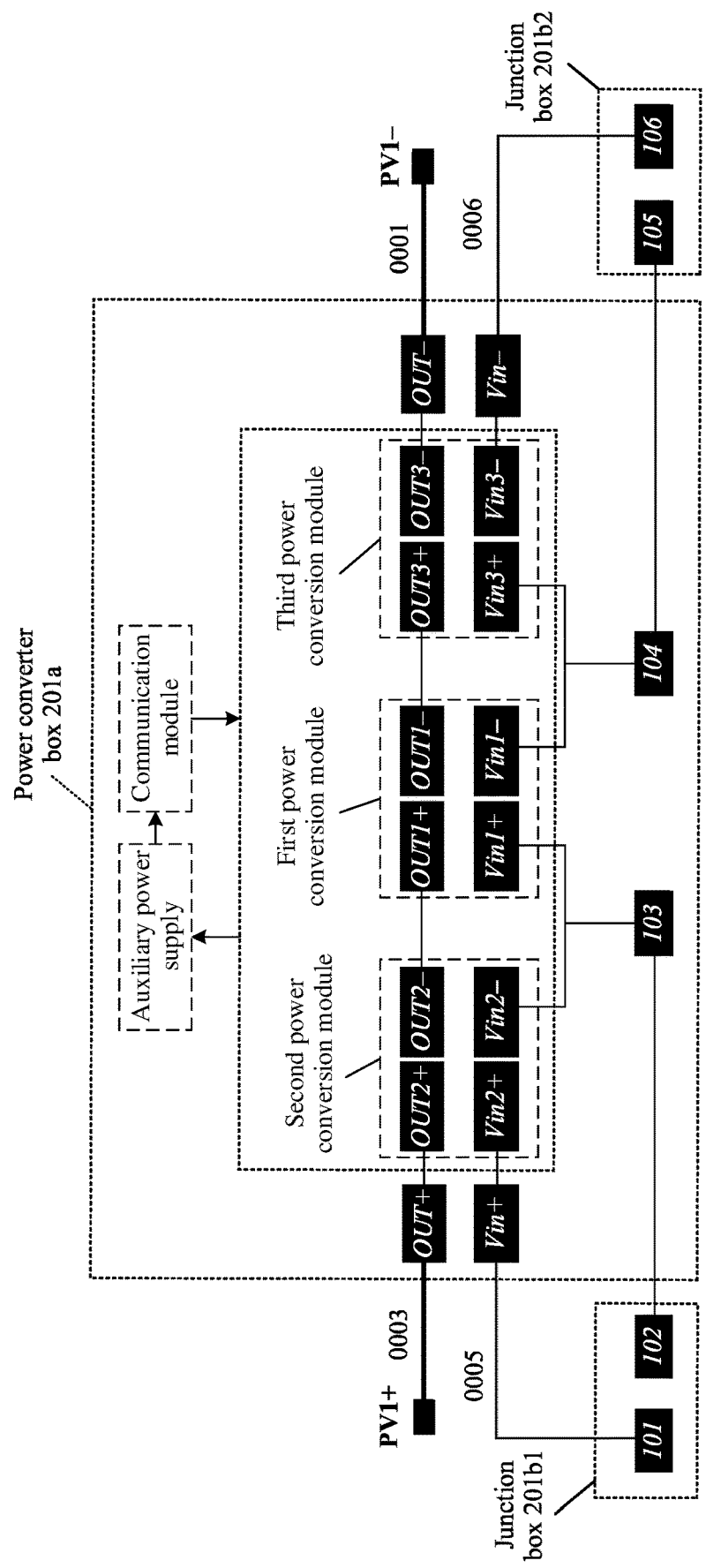

In some feasible implementations, for a part of block diagrams of internal structures of the power converter box 201a and the junction boxes 201b1 and 201b2 shown in FIG. 6, alternatively refer to FIG. 11C. As shown in FIG. 11C, the power converter box 201a includes at least one power conversion module, where the at least one power conversion module includes a plurality of power conversion modules (for example, a first power conversion module, a second power conversion module, and a third power conversion module) corresponding to a plurality of photovoltaic substring groups, and the plurality of power conversion modules each have one group of input terminals and one group of output terminals.

Each photovoltaic substring group includes any one or more of the photovoltaic substrings in the photovoltaic module 201. It should be noted that, in FIG. 11C, that each photovoltaic substring group includes one photovoltaic substring in the photovoltaic module is used as an example. It should be understood that a quantity of photovoltaic substrings included in the photovoltaic substring group is not limited, and photovoltaic substrings with a same output voltage may be used as a photovoltaic substring group to share a power conversion module to implement MPPT.

Input terminals of each power conversion module are respectively coupled to output terminals of a corresponding photovoltaic substring group, to process a power output by each photovoltaic substring group to obtain the second power.

For example, the first power conversion module corresponds to a first photovoltaic substring group (namely, the first photovoltaic substring 2011), and the positive output terminal of the first photovoltaic substring 2011 is coupled to the first positive connection terminal 103 of the power converter box 201a, where the first positive connection terminal 103 and a positive input terminal Vin1+ of the first power conversion module can be coupled through a circuit board cable, that is, the positive output terminal of the first photovoltaic substring 2011 is coupled to the positive input terminal Vin1+ of the first power conversion module. The negative output terminal of the first photovoltaic substring 2011 is coupled to the first negative connection terminal 104 of the power converter box 201a of the power converter box 201a, where the first negative connection terminal 104 and a negative input terminal Vint− of the first power conversion module can be coupled through a circuit board cable, that is, the negative output terminal of the first photovoltaic substring 2011 is coupled to the negative input terminal Vin1− of the first power conversion module. In this case, the first power conversion module can perform MPPT on the first photovoltaic substring 2011.

The second power conversion module corresponds to a second photovoltaic substring group (namely, the second photovoltaic substring 2012), and the positive output terminal of the second photovoltaic substring 2012 is coupled to the second positive connection terminal 101 of the junction box 201*b*1, where the second positive connection terminal 101 is coupled to a terminal Vin+ through the first sub cable 0005, and the terminal Vin+ may be coupled to a positive input terminal Vin2+ of the second power conversion module through a circuit board cable, that is, the positive output terminal of the second photovoltaic substring 2012 is coupled to the positive input terminal Vin2+ of the second power conversion module. The negative output terminal of the second photovoltaic substring 2012 is coupled to the second negative connection terminal 102 of the junction box 201*b*1, where the second negative connection terminal 102 is coupled to the first positive connection terminal 103 of the power converter box 201*a* through the first solder ribbon 14, and the first positive connection terminal 103 is coupled to a negative input terminal Vin2− of the second power conversion module, that is, the negative output terminal of the second photovoltaic substring 2012 is coupled to the negative input terminal Vin2− of the second power conversion module. In this case, the second power conversion module can perform MPPT on the second photovoltaic substring 2012.

The third power conversion module corresponds to a third photovoltaic substring group (namely, the second photovoltaic sub-string 2013), and the positive output terminal of the second photovoltaic substring 2013 is coupled to the second positive connection terminal 105 of the junction box 201*b*2, where the second positive connection terminal 105 is coupled to the first negative connection terminal 104 of the power converter box 201*a* through the second solder ribbon 15, and the first negative connection terminal 104 is coupled to a positive input terminal Vin3+ of the third power conversion module, that is, the positive output terminal of the second photovoltaic substring 2013 is coupled to the positive input terminal Vin3+ of the third power conversion module. The negative output terminal of the second photovoltaic substring 2013 is coupled to the second negative connection terminal 106 of the junction box 201*b*2, the second negative connection terminal 106 is coupled to a terminal Vin− through the second sub cable 0006, and the terminal Vin− may be coupled to a negative input terminal Vin3− of the third power conversion module through a circuit board cable, that is, the negative output terminal of the second photovoltaic substring 2013 is coupled to the negative input terminal Vin3− of the third power conversion module. In this case, the third power conversion module can perform MPPT on the second photovoltaic substring 2013.

A negative output terminal OUT2− of the second power conversion module is coupled to a positive output terminal OUT1+ of the first power conversion module; and a negative output terminal OUT1− of the first power conversion module is coupled to a positive output terminal OUT3+ of the third power conversion module. In this case, output terminals of the power conversion modules are coupled in series, and two terminals obtained after the output terminals of the power conversion modules are coupled in series are respectively a positive output terminal OUT2+ of the second power conversion module and a negative output terminal OUT3− of the third power conversion module. For example, the power converter box 201*a* further has four terminals, for example, the terminal Vin+, the terminal Yin−, the terminal OUT+, and the terminal OUT−. The positive output terminal OUT2+ of the second power conversion module is coupled to the terminal OUT+, and the terminal OUT+ (namely, the positive output terminal PV1+ of the photovoltaic module 201) is coupled to a positive input terminal of the inverter 21; and the negative output terminal OUT3− of the third power conversion module is coupled to the terminal OUT−, and the terminal OUT− (namely, the negative output terminal PV1− of the photovoltaic module 201) is coupled to a negative input terminal of the inverter 21.

It should be noted that, in this embodiment, the terminal Vin+ and the terminal Yin− may respectively share a terminal with the input terminals of the power conversion module, and the terminal OUT+ and the terminal OUT− may respectively share a terminal with the output terminals of the power conversion module. For example, the positive input terminal Vin2+ of the second power conversion module and the terminal Vin+ are combined into one terminal while the positive output terminal OUT2+ of the second power conversion module and the terminal OUT+ are combined into one terminal. A quantity of terminals is not limited in this embodiment.

In this embodiment, a power conversion module corresponding to each photovoltaic substring may be disposed to implement substring-level MPPT, and a difference between this embodiment and both FIG. 11A and FIG. 11B lies in that the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, the security of the use of the photovoltaic module can be also improved.

The following describes in detail the photovoltaic module shown in FIG. 3 with reference to FIGS. 12 to FIG. 16.

Figure 12:
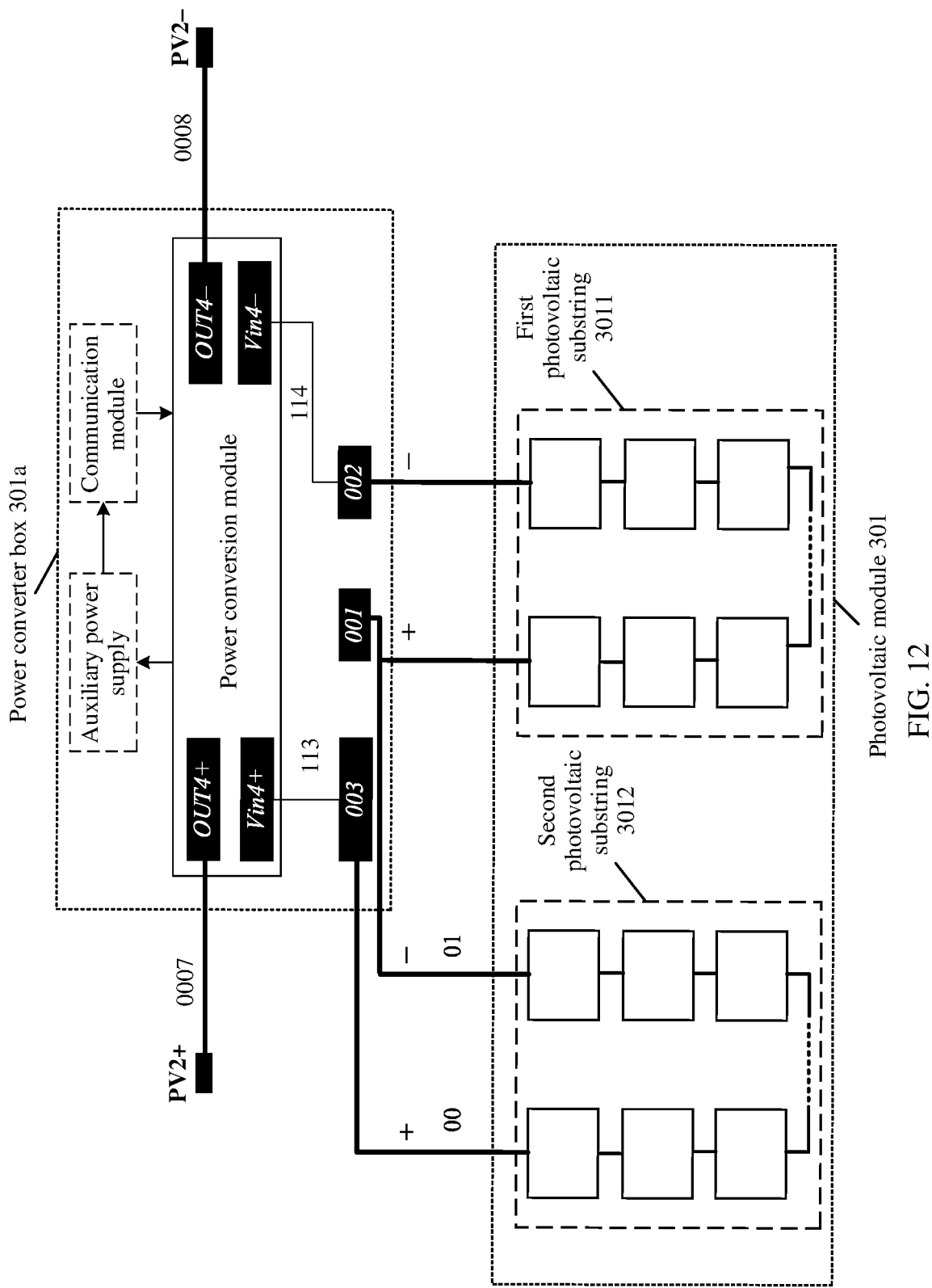
FIG. 12 is a block diagram of another structure of a photovoltaic module according to an embodiment.

In some feasible implementations, FIG. 12 is a block diagram of another structure of a photovoltaic module according to an embodiment. As shown in FIG. 12, the photovoltaic module 301 includes two photovoltaic substrings (for example, a first photovoltaic substring 3011 and a second photovoltaic substring 3012) and a power converter box 301*a*.

The power converter box 301*a* includes a third group of connection terminals and a fourth group of connection terminals, where the third group of connection terminals is coupled to output terminals of the first photovoltaic substring 3011, and the fourth group of connection terminals is coupled to output terminals of the second photovoltaic substring 3012. The third group of connection terminals includes a third positive connection terminal 001 and a third negative connection terminal 002, where the third positive connection terminal 001 is coupled to a positive output terminal of the first photovoltaic substring 3011 through a solder ribbon, and the third negative connection terminal 002 is coupled to a negative output terminal of the first photovoltaic substring 3011 through a solder ribbon. The fourth group of connection terminals includes a connection terminal 003. The connection terminal 003 is coupled to a positive output terminal of the second photovoltaic substring 3012 through a solder ribbon 00, and a negative output terminal of the second photovoltaic substring 3012 may be coupled to the third positive connection terminal 001 through a solder ribbon 01. It may be understood that the negative output terminal of the second photovoltaic substring 3012 should be coupled to a fourth negative connection terminal in the fourth group of connection terminals. However, because the first photovoltaic substring 3011 and the second photovoltaic substring 3012 need to be connected in series, in this case, the negative output terminal of the second photovoltaic substring 3012 can be directly coupled to the third positive connection terminal 001 through the solder ribbon 01, thereby saving a terminal, and reducing a volume of the power converter box 301*a*. In other words, a connection relationship is established among the connection terminals of the power converter box 301*a* when an output terminal of a photovoltaic substring is coupled to a corresponding connection terminal of the power converter box 301*a* through a solder ribbon, for example, the third group of connection terminals and the fourth group of connection terminals are coupled through the solder ribbons.

The power converter box 301*a* further includes at least one power conversion module. In FIG. 12, that the power converter box 301*a* includes one power conversion module is used as an example. The power conversion module includes one group of input terminals and one group of output terminals. The input terminals of the power conversion module may receive a first power output after the output terminals of the first photovoltaic substring 3011 and the output terminals of the second photovoltaic substring 3012 are coupled in series.

The group of input terminals of the power conversion module includes a positive input terminal Vin4+ and a negative input terminal Vin4−.

A negative port (namely, the negative output terminal of the first photovoltaic substring 3011) obtained after the output terminals of the first photovoltaic substring 3011 and the output terminals of the second photovoltaic substring 3012 are coupled in series is coupled to a third target connection terminal (namely, the third negative connection terminal 002 of the power converter box 301*a*) of the power converter box 301*a*. In this case, the third negative connection terminal 002 of the power converter box 301*a* is coupled to the negative input terminal Vin4− of the power conversion module through a circuit board cable 114. In addition, a positive port (namely, the positive output terminal of the second photovoltaic substring 3012) obtained after the output terminals of the first photovoltaic substring 3011 and the output terminals of the second photovoltaic substring 3012 are coupled in series is coupled to a fourth target connection terminal (namely, the connection terminal 003) of the power converter box 301*a*. In this case, the connection terminal 003 is coupled to the positive input terminal Vin4+ of the power conversion module through a circuit board cable 113.

Figure 13:
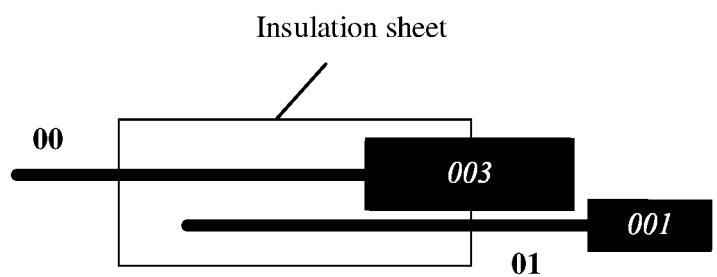
FIG. 13 is an expanded view of a solder ribbon according to an embodiment.

Optionally, the solder ribbon 00 and the solder ribbon 01 are overlapped and cabled in parallel. In FIG. 13, an expanded view in which the solder ribbon 00 and the solder ribbon 01 are overlapped is used as an example to describe in detail parallel overlapping and cabling. As shown in FIG. 13, the solder ribbon 00 and the solder ribbon 01 are isolated by an insulation sheet, the solder ribbon 01 is below the insulation sheet, and the solder ribbon 00 is above the insulation sheet. Alternatively, the solder ribbon 01 is above the insulation sheet, and the solder ribbon 00 is below the insulation sheet (not shown in the figure). By implementing this embodiment, a volume of the power converter box can be reduced to improve space utilization of the photovoltaic module.

For implementation of the power conversion module in this embodiment, refer to the foregoing embodiment described with reference to FIG. 7. Details are not described herein again.

Figure 14:
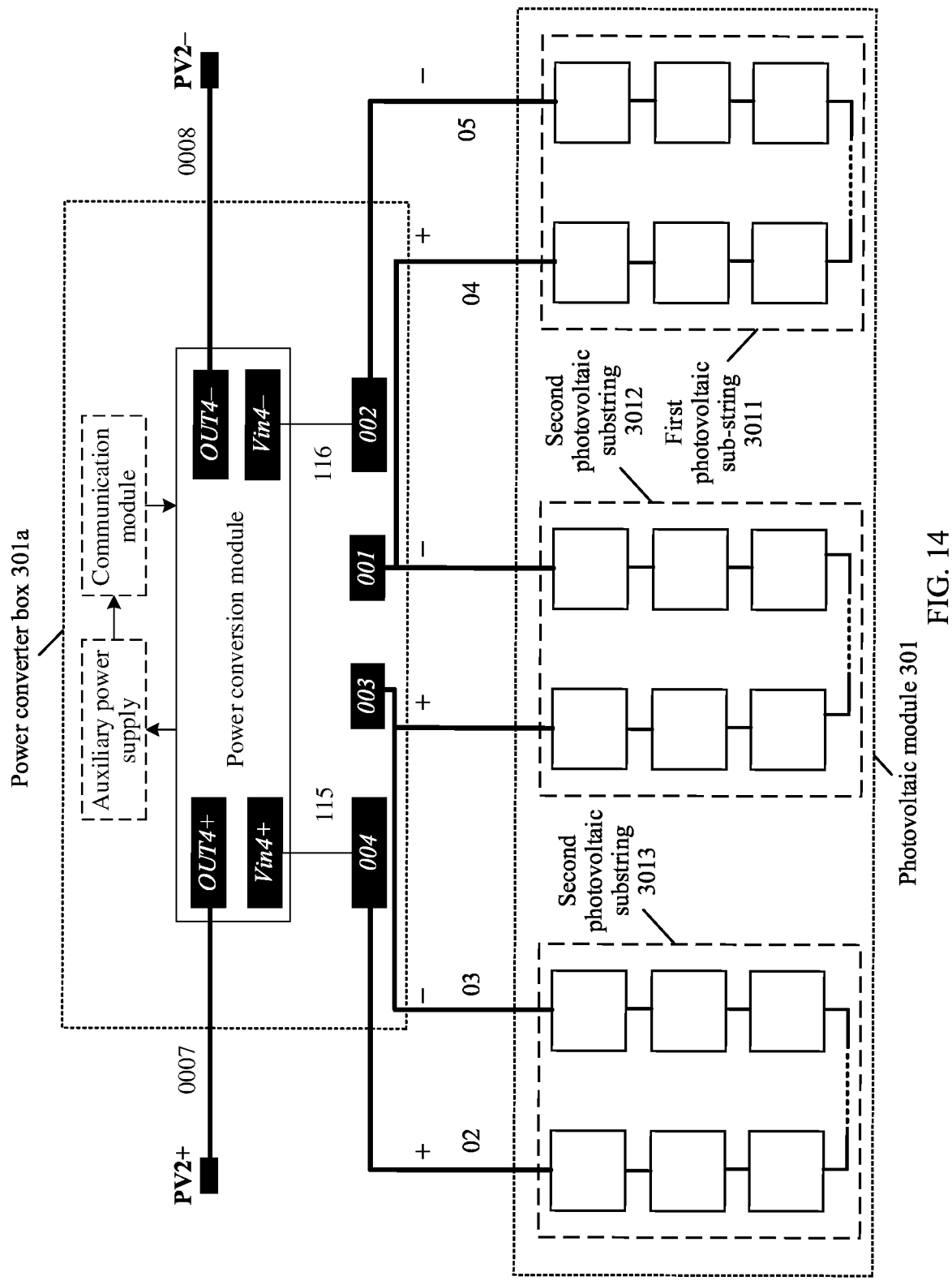
FIG. 14 is a block diagram of another structure of a photovoltaic module according to an embodiment.

In some feasible implementations, FIG. 14 is a block diagram of another structure of a photovoltaic module according to an embodiment. As shown in FIG. 14, a difference between this embodiment and the photovoltaic module shown in FIG. 12 lies in that this embodiment includes three photovoltaic substrings, for example, a first photovoltaic substring 3011, a second photovoltaic substring 3012, and a second photovoltaic substring 3013.

In an implementation, output terminals of the first photovoltaic substring 3011 are coupled to the third group of connection terminals of the power converter box 301*a*, and output terminals of the second photovoltaic substring 3012 and output terminals of the second photovoltaic substring 3013 are respectively coupled to a corresponding fourth group of connection terminals. The third group of connection terminals includes a third positive connection terminal 001 and a first negative connection terminal 002, where the third positive connection terminal 001 is coupled to a positive output terminal of the first photovoltaic substring 3011 through a solder ribbon 04, and the third negative connection terminal 002 is coupled to a negative output terminal of the first photovoltaic substring 3011 through a solder ribbon 05. The fourth group of connection terminals includes a connection terminal 003 and a connection terminal 004, where the connection terminal 003 is coupled to a positive output terminal of the second photovoltaic substring 3012, and a negative output terminal of the second photovoltaic substring 3012 is coupled to the third positive connection terminal 001. In this case, the second photovoltaic substring 3012 and the first photovoltaic substring 3011 are connected in series. The connection terminal 004 is coupled to a positive output terminal of the second photovoltaic substring 3013 through a solder ribbon 02, and a negative output terminal of the second photovoltaic substring 3013 is coupled to the connection terminal 003 through a solder ribbon 03. In this case, the output terminals of the first photovoltaic substring 3011, the output terminals of the second photovoltaic substring 3012, and the output terminals of the second photovoltaic substring 3013 can be coupled in series.

Optionally, the solder ribbon 02 and the solder ribbon 03 may be overlapped and cabled in parallel, and the solder ribbon 04 and the solder ribbon 05 may be overlapped and cabled in parallel. For an implementation, refer to the implementation between the solder ribbon 00 and the solder ribbon 01. Details are not described herein again.

For example, a negative port (namely, the negative output terminal of the first photovoltaic substring 3011) obtained after the output terminals of the first photovoltaic substring 3011, the output terminals of the second photovoltaic substring 3012, and the output terminals of the second photovoltaic substring 3013 are coupled in series is coupled to a third target connection terminal (namely, the third negative connection terminal 002 of the power converter box 301*a*) of the power converter box 301*a*. In this case, the third negative connection terminal 002 of the power converter box 301*a* is coupled to a negative input terminal Vin4− of a power conversion module through a circuit board cable 116. A positive port (namely, the positive output terminal of the second photovoltaic substring 3013) obtained after the output terminals of the first photovoltaic substring 3011, the output terminals of the second photovoltaic substring 3012, and the output terminals of the second photovoltaic substring 3013 are coupled in series is coupled to a fourth target connection terminal (namely, the connection terminal 004) of the power converter box 301*a*. In this case, the connection terminal 004 is coupled to a positive input terminal Vin4+ of the power conversion module through a circuit board cable 115.

In this embodiment, one terminal of the third group of connection terminals (for example, the third negative connection terminal 002) of the power converter box 301*a* and one terminal of the fourth group of connection terminals (for example, the connection terminal 004) are coupled to the input terminals of the power conversion module through the circuit board cables.

Figure 15:
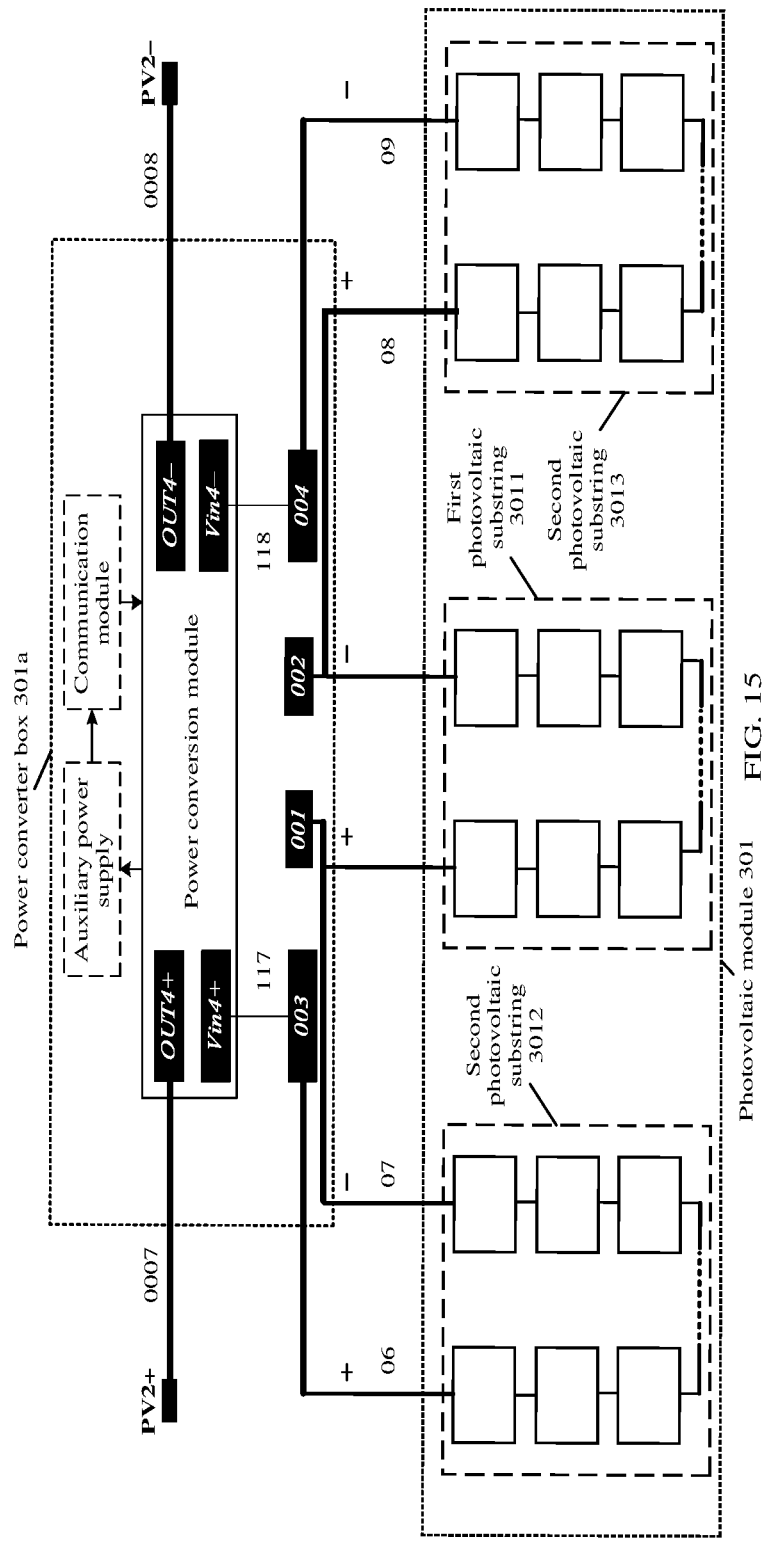
FIG. 15 is a block diagram of another structure of a photovoltaic module according to an embodiment.

In some feasible implementations, FIG. 15 is a block diagram of another structure of a photovoltaic module according to an embodiment. A difference between the photovoltaic module shown in FIG. 15 and the photovoltaic module shown in FIG. 14 lies in that a first photovoltaic substring 3011 is located between a second photovoltaic substring 3012 and a second photovoltaic substring 3013. In this case, two terminals of a fourth group of connection terminals of a power converter box 301*a* are coupled to input terminals of a power conversion module through a circuit board cable, that is, a third group of connection terminals is not coupled to the input terminals of the power conversion module.

In an implementation, output terminals of the first photovoltaic substring 3011 are coupled to the third group of connection terminals of the power converter box 301*a*, and output terminals of the second photovoltaic substring 3012 and output terminals of the second photovoltaic substring 3013 are respectively coupled to a corresponding fourth group of connection terminals. The third group of connection terminals includes a third positive connection terminal 001 and a first negative connection terminal 002, where the third positive connection terminal 001 is coupled to a positive output terminal of the first photovoltaic substring 3011, and the third negative connection terminal 002 is coupled to a negative output terminal of the first photovoltaic substring 3011. The fourth group of connection terminals includes a connection terminal 003 and a connection terminal 004, where the connection terminal 003 is coupled to a positive output terminal of the second photovoltaic substring 3012 through a solder ribbon 06, and a negative output terminal of the second photovoltaic substring 3012 is coupled to the third positive connection terminal 001 through a solder ribbon 07. In this case, the second photovoltaic substring 3012 and the first photovoltaic substring 3011 are connected in series. The connection terminal 004 is coupled to a positive output terminal of the second photovoltaic substring 3013 through a solder ribbon 09, and a negative output terminal of the second photovoltaic substring 3013 is coupled to the third negative connection terminal 002 through a solder ribbon 08. In this case, the output terminals of the first photovoltaic substring 3011, the output terminals of the second photovoltaic substring 3012, and the output terminals of the second photovoltaic substring 3013 can be coupled in series.

Optionally, the solder ribbon 06 and the solder ribbon 07 may be overlapped and cabled in parallel, and the solder ribbon 08 and the solder ribbon 09 may be overlapped and cabled in parallel. For an implementation, refer to the implementation between the solder ribbon 00 and the solder ribbon 01. Details are not described herein again.

For example, a positive port (namely, the positive output terminal of the second photovoltaic substring 3012) obtained after the output terminals of the first photovoltaic substring 3011, the output terminals of the second photovoltaic substring 3012, and the output terminals of the second photovoltaic substring 3013 are coupled in series is coupled to a third target connection terminal (namely, the connection terminal 003) of the power converter box 301*a*. In this case, the connection terminal 003 is coupled to a positive input terminal Vin4+ of the power conversion module through a circuit board cable 117. In addition, a negative port (namely, the negative output terminal of the second photovoltaic substring 3013) obtained after the output terminals of the first photovoltaic substring 3011, the output terminals of the second photovoltaic substring 3012, and the output terminals of the second photovoltaic substring 3013 are coupled in series is coupled to a fourth target connection terminal (namely, the connection terminal 004) of the power converter box 301*a*. In this case, the connection terminal 004 is coupled to a negative input terminal Vin4− of the power conversion module through a circuit board cable 118.

In this embodiment, only the two terminals of the fourth group of connection terminals (for example, the connection terminal 003 and the connection terminal 004) of the power converter box 301*a* are coupled to the input terminals of the power conversion module through the circuit board cables.

The power conversion module may perform MPPT processing on the first photovoltaic substring and the second photovoltaic substrings connected in series (namely, the photovoltaic module 301), and transmit a processed second power to the inverter 31. In an implementation, output terminals of the power conversion module are separately coupled to the inverter 31 through a third cable. For example, a positive output terminal OUT4+ of the power conversion module (namely, a positive output terminal PV2+ of the photovoltaic module 301) is coupled to a positive input terminal of the inverter 31 through a third cable 0007, and a negative output terminal OUT4− of the power conversion module (namely, a negative output terminal PV2− of the photovoltaic module 301) is coupled to a negative input terminal of the inverter 31 through a third cable 0008.

This embodiment is another implementation of saving an external cable between a conventional power converter and a junction box. Only the power converter box is integrated on a backplane of the photovoltaic module. The third group of connection terminals and the fourth group of connection terminals in the power converter box can be coupled in series to the output terminals of all the photovoltaic substrings in the photovoltaic module through the solder ribbon, and the ports obtained after the output terminals of all the photovoltaic substrings in the photovoltaic module are coupled in series can be coupled to the input terminals of the power conversion module through the circuit board cables. The photovoltaic module in this embodiment has an MPPT function and does not need to be connected to an independently placed power converter through a cable compared with a conventional photovoltaic module. This may provide a new photovoltaic module with low production costs and strong applicability by establishing a connection relationship by using a solder ribbon and a circuit board cable.

Figure 16:
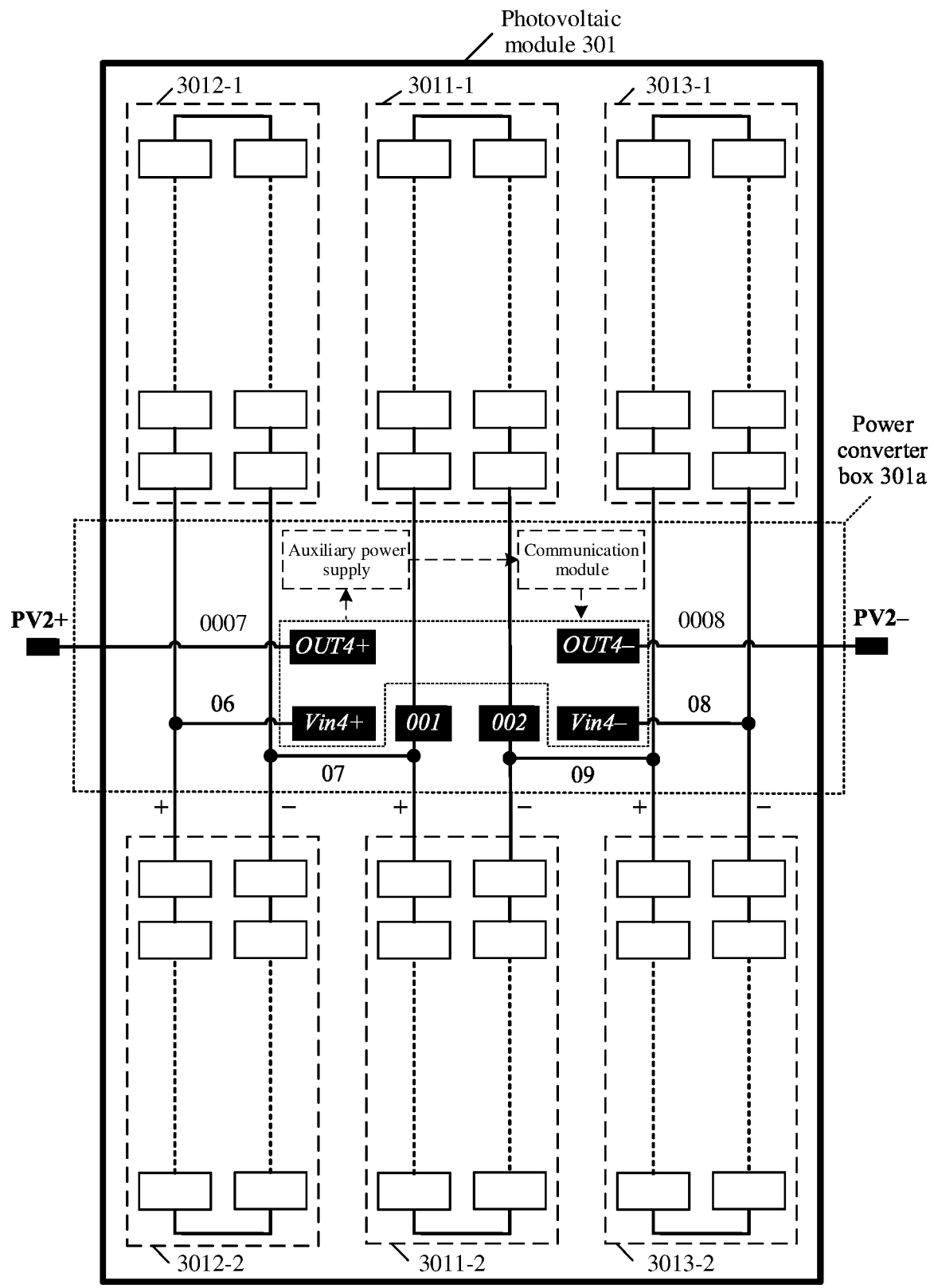
FIG. 16 is a block diagram of another structure of a photovoltaic module according to an embodiment.

In some feasible implementations, FIG. 16 is a block diagram of another structure of a photovoltaic module according to an embodiment. As shown in FIG. 16, each photovoltaic substring in the photovoltaic module 301 includes two substring units connected in parallel, where a parallel point between the two substring units connected in parallel is an output terminal of the photovoltaic substring in which the two substring units connected in parallel are located.

In FIG. 16, that each photovoltaic substring in the photovoltaic module shown in FIG. 15 includes two substring units connected in parallel is used as an example. As shown in FIG. 16, the first photovoltaic substring 3011 includes a substring unit 3011-1 and a substring unit 3011-2, and a parallel point between the substring unit 3011-1 and the substring unit 3011-2 is an output terminal of the first photovoltaic substring 3011. The second photovoltaic substring 3012 includes a substring unit 3012-1 and a substring unit 3012-2, and a parallel point between the substring unit 3012-1 and the substring unit 3012-2 is an output terminal of the second photovoltaic substring 3012. The second photovoltaic substring 3013 includes a substring unit 3013-1 and a substring unit 3013-2, and a parallel point between the substring unit 3013-1 and the substring unit 3013-2 is an output terminal of the second photovoltaic substring 3013.

In an implementation, a positive output terminal of the substring unit 3011-1 and a positive output terminal of the substring unit 3011-2 are connected in parallel, and are coupled to the third positive connection terminal 001 of the power converter box 301a; and a negative output terminal of the substring unit 3011-1 and a negative output terminal of the substring unit 3011-2 are connected in parallel, and are coupled to the third negative connection terminal 002 of the power converter box 301a. A positive output terminal of the substring unit 3012-1 and a positive output terminal of the substring unit 3012-2 are connected in parallel, and are coupled to the positive input terminal Vin4+ of the power conversion module; and a negative output terminal of the substring unit 3012-1 and a negative output terminal of the substring unit 3012-2 are connected in parallel, and are coupled to the third positive connection terminal 001 of the power converter box 301a. A positive output terminal of the substring unit 3013-1 and a positive output terminal of the substring unit 3013-2 are connected in parallel, and are coupled to the third negative connection terminal 002 of the power conversion box 301a; and a negative output terminal of the substring unit 3013-1 and a negative output terminal of the substring unit 3013-1 are connected in parallel, and are coupled to the negative input terminal Vin4− of the power conversion module. It may be understood that, in the power converter box shown in FIG. 16, the fourth group of connection terminals respectively shares a terminal with the input terminals of the power conversion module. For example, the connection terminal 003 is the positive input terminal Vin4+, and the connection terminal 004 is the negative input terminal Vin4−. In other words, the output terminals of the first photovoltaic substring 3011, the output terminals of the second photovoltaic substring 3012, and the output terminals of the second photovoltaic substring 2013 are coupled in series, and ports obtained after the photovoltaic substrings are coupled in series are coupled to the input terminals of the power conversion module.

The positive output terminal OUT4+ of the power conversion module (namely, the positive output terminal PV2+ of the photovoltaic module 301) is coupled to the positive input terminal of the inverter 31 through the third cable 0007, and the negative output terminal OUT4− of the power conversion module (namely, the negative output terminal PV2− of the photovoltaic module 301) is coupled to the negative input terminal of the inverter 31 through the third cable 0006. In this case, the output terminals of the power conversion module can transmit the second power processed by the power conversion module to the inverter 31.

In this embodiment, a photovoltaic substring in the photovoltaic module is divided into two substring units connected in parallel, so that heat of the photovoltaic substring can be reduced when it is ensured that a same power is output by the photovoltaic module.

The following describes, with reference to FIGS. 17A to FIG. 19B and with examples, the power converter box described in FIGS. 12 to FIG. 15.

Figure 17A:
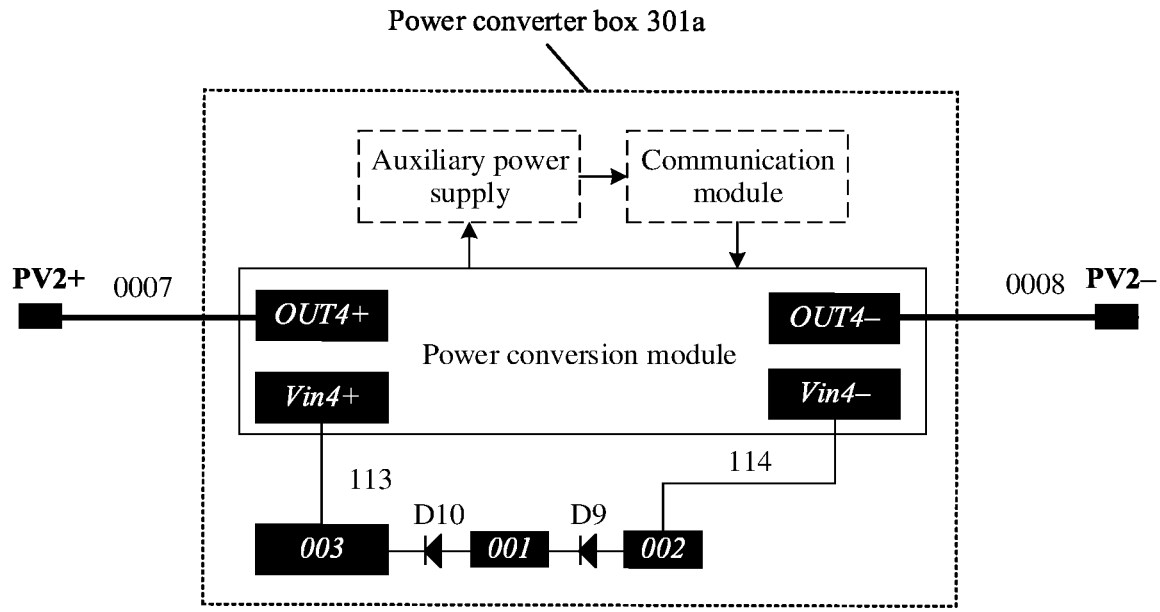
FIGS. 17A and FIG. 17B are block diagrams of internal structures of a power converter box according to an embodiment.

In some feasible implementations, for a part of block diagram of an internal structure of the power converter box 301a shown in FIG. 12, refer to FIG. 17A. As shown in FIG. 17A, the power converter box 301a further includes a third diode D9 and a fourth diode D10.

The third diode D9 is connected in parallel between the third positive connection terminal 001 and the third negative connection terminal 002 of the power converter box 301a in reverse directions. In an implementation, a cathode of the third diode D9 is coupled to the third positive connection terminal 001 (that is, the cathode of the third diode D9 is coupled to the positive output terminal of the first photovoltaic substring 3011), and an anode of the third diode D9 is coupled to the third negative connection terminal 002 (that is, the anode of the third diode D9 is coupled to the negative output terminal of the first photovoltaic substring 3011).

The fourth diode D10 is connected in parallel between the fourth group of connection terminals (for example, the connection terminal 003) and the third positive connection terminal 001 in reverse directions. A cathode of the fourth diode D10 may be coupled to the connection terminal 003 (that is, the cathode of the fourth diode D10 is coupled to the positive output terminal of the second photovoltaic substring 3012), and an anode of the fourth diode D10 is coupled to the third positive connection terminal 001 (that is, the anode of the fourth diode D10 is coupled to the negative output terminal of the second photovoltaic substring 3012).

In this embodiment, the output terminals of the first photovoltaic substring and the output terminals of the second photovoltaic substring each are connected in parallel to a diode in reverse directions, and the diodes can prevent some photovoltaic substrings from becoming loads of another photovoltaic substring and being damaged by heat emitting because the photovoltaic substrings have insufficient output voltages due to problems such as shielding. In other words, security of use of the photovoltaic module can be improved.

Figure 17B:
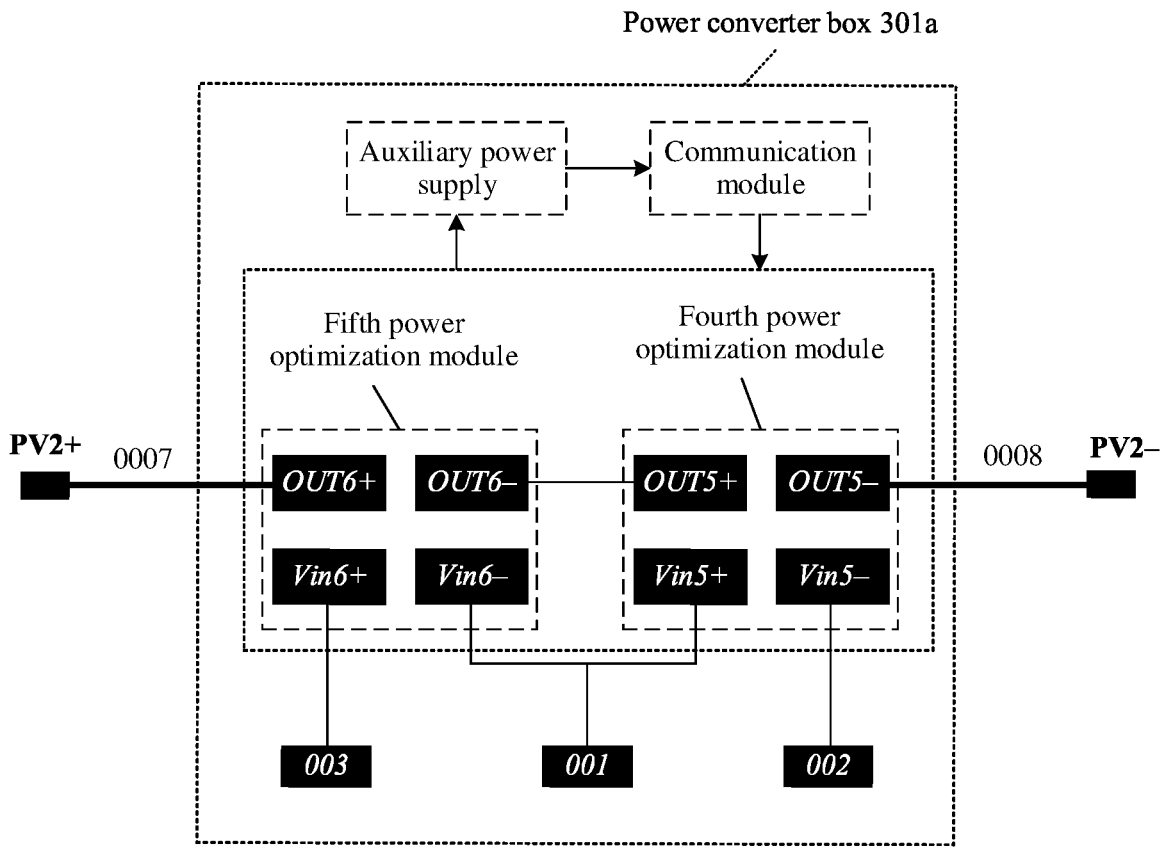

Optionally, in some feasible implementations, for a block diagram of an internal structure of the power converter box 301a shown in FIG. 12, alternatively refer to FIG. 17B. As shown in FIG. 17B, the power converter box 301a includes a fourth power conversion module and a fifth power conversion module.

The fourth power conversion module corresponds to the first photovoltaic substring 3011, the positive output terminal of the first photovoltaic substring 3011 is coupled to the third positive connection terminal 001 of the power converter box 301a, and the third positive connection terminal 001 may be coupled to a positive input terminal Vin5+ of the fourth power conversion module through a circuit board cable. The negative output terminal of the first photovoltaic substring 3011 is coupled to the third negative connection terminal 002 of the power converter box 301a, and the third negative connection terminal 002 may be coupled to a negative input terminal Vin5− of the fourth power conversion module through a circuit board cable. In this case, the fourth power conversion module can perform MPPT on the first photovoltaic substring 3011.

The fifth power conversion module corresponds to the second photovoltaic substring 3012, the positive output terminal of the second photovoltaic substring 3012 is coupled to the connection terminal 003 of the power converter box 301*a*, and the connection terminal 003 may be coupled to a positive input terminal Vin6+ of the fifth power conversion module through a circuit board cable. The negative output terminal of the second photovoltaic substring 3012 is coupled to the third positive connection terminal 001 of the power converter box 301*a*, and the third positive connection terminal 001 may be coupled to a negative input terminal Vin6− of the fifth power conversion module through a circuit board cable. In this case, the fifth power conversion module can perform MPPT on the second photovoltaic substring 3012.

A negative output terminal OUT6− of the fifth power conversion module is coupled to a positive output terminal OUT5+ of the fourth power conversion module. In this case, output terminals of the fifth power conversion module and output terminals of the fourth power conversion module are coupled in series, and two terminals obtained after the output terminals of the fifth power conversion module and the output terminals of the fourth power conversion module are coupled in series are respectively a positive output terminal OUT6+ of the fifth power conversion module and a negative output terminal OUT5− of the fourth power conversion module. For example, the positive output terminal OUT6+ of the fifth power conversion module (namely, the positive output terminal PV2+ of the photovoltaic module 301) is coupled to the positive input terminal of the inverter 31 through the third cable 0007, and the negative output terminal OUT5− of the fourth power conversion module (namely, the negative output terminal PV2− of the photovoltaic module 301) is coupled to the negative input terminal of the inverter 31.

In this embodiment, a power conversion module corresponding to each photovoltaic substring may be disposed to implement substring-level MPPT, and a difference between this embodiment and FIG. 17A lies in that the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, the security of the use of the photovoltaic module can be also improved.

Figure 18:
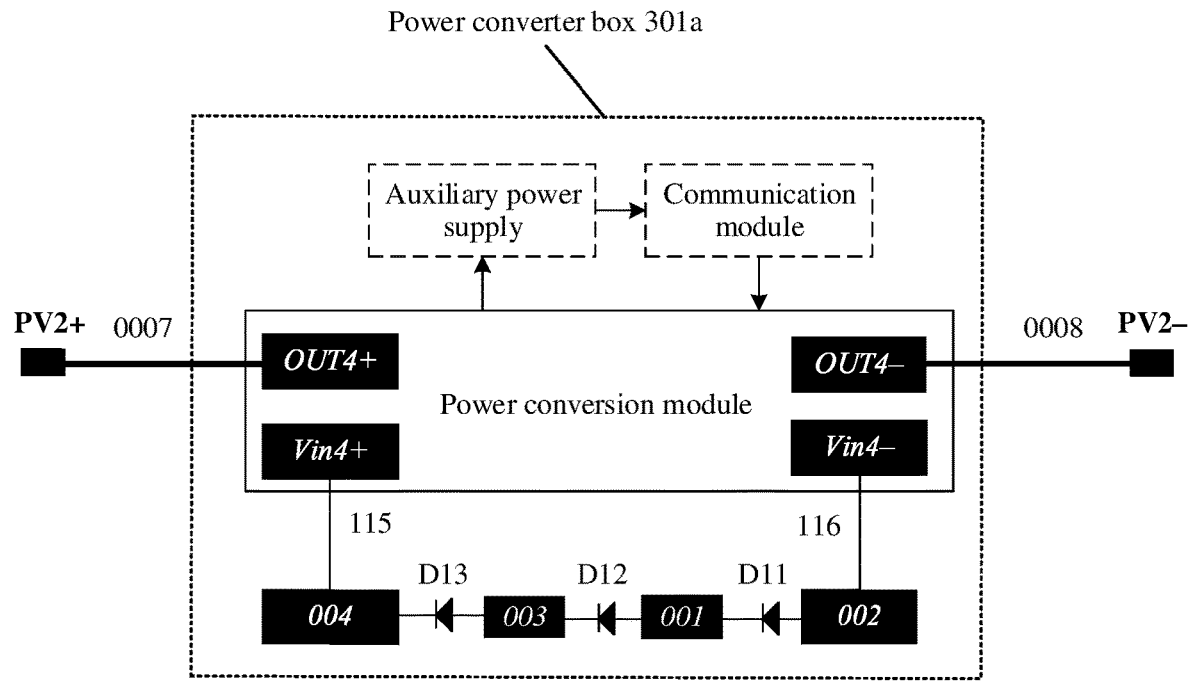
FIG. 18 is another block diagram of an internal structure of a power converter box according to an embodiment.

In some feasible implementations, for a part of block diagram of an internal structure of the power converter box 301*a* shown in FIG. 14, refer to FIG. 18. As shown in FIG. 18, the power converter box 301*a* further includes a third diode D11, a fourth diode D12, and a fourth diode D13.

The third diode D11 is connected in parallel between the third positive connection terminal 001 and the third negative connection terminal 002 of the power converter box 301*a* in reverse directions. In an implementation, a cathode of the third diode D11 is coupled to the third positive connection terminal 001 (that is, the cathode of the third diode D11 is coupled to the positive output terminal of the first photovoltaic substring 3011), and an anode of the third diode D11 is coupled to the third negative connection terminal 002 (that is, the anode of the third diode D11 is coupled to the negative output terminal of the first photovoltaic substring 3011).

The fourth diode D12 is connected in parallel between the fourth group of connection terminals (for example, the connection terminal 003) and the third positive connection terminal 001 in reverse directions. A cathode of the fourth diode D12 may be coupled to the connection terminal 003 (that is, the cathode of the fourth diode D12 is coupled to the positive output terminal of the second photovoltaic substring 3012), and an anode of the fourth diode D12 is coupled to the third positive connection terminal 001 (that is, the anode of the fourth diode D12 is coupled to the negative output terminal of the second photovoltaic substring 3012).

The fourth diode D13 is connected in parallel between the connection terminal 004 and the connection terminal 003 in reverse directions. A cathode of the fourth diode D13 may be coupled to the connection terminal 004 (that is, the cathode of the fourth diode D13 is coupled to the positive output terminal of the second photovoltaic substring 3013), and an anode of the fourth diode D13 is coupled to the connection terminal 003 (that is, the anode of the fourth diode D13 is coupled to the negative output terminal of the second photovoltaic substring 3013).

Figure 19A:
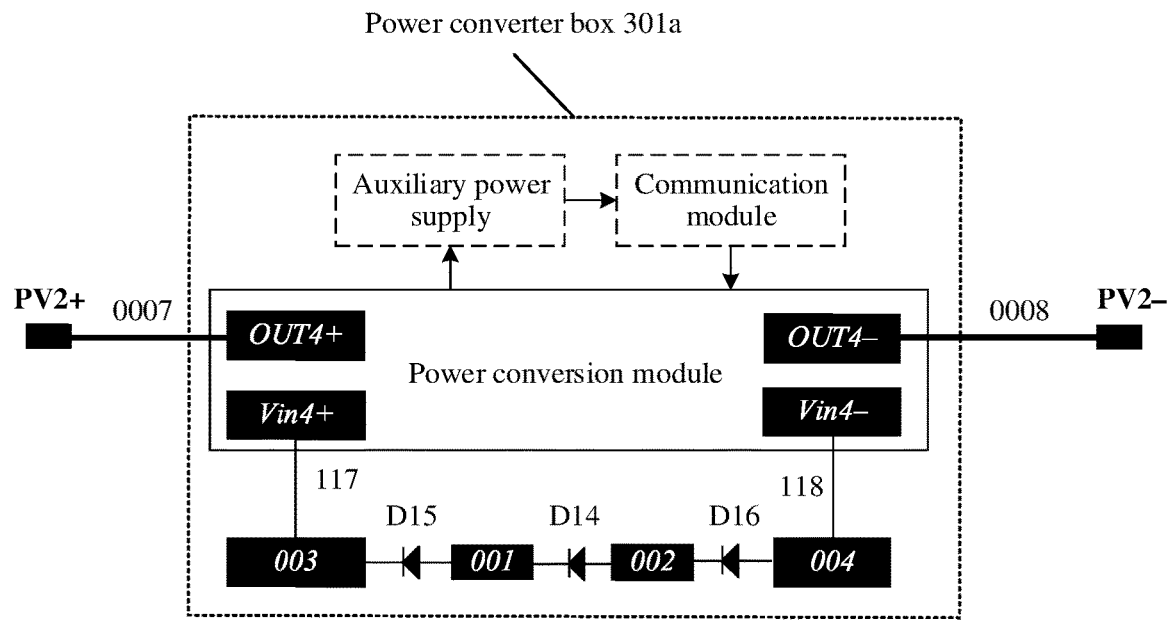
FIGS. 19A and FIG. 19B are block diagrams of internal structures of a power converter box according to an embodiment.

In some feasible implementations, for a part of block diagram of an internal structure of the power converter box 301*a* shown in FIG. 15, refer to FIG. 19A. As shown in FIG. 19A, the power converter box 301*a* further includes a third diode D14, a fourth diode D15, and a fourth diode D16.

The third diode D14 is connected in parallel between the third positive connection terminal 001 and the third negative connection terminal 002 of the power converter box 301*a* in reverse directions. In an implementation, a cathode of the third diode D14 is coupled to the third positive connection terminal 001 (that is, the cathode of the third diode D14 is coupled to the positive output terminal of the first photovoltaic substring 3011), and an anode of the third diode D14 is coupled to the third negative connection terminal 002 (that is, the anode of the third diode D14 is coupled to the negative output terminal of the first photovoltaic substring 3011).

The fourth diode D15 is connected in parallel between the fourth group of connection terminals (for example, the connection terminal 003) and the third positive connection terminal 001 in reverse directions. A cathode of the fourth diode D15 may be coupled to the connection terminal 003 (that is, the cathode of the fourth diode D15 is coupled to the positive output terminal of the second photovoltaic substring 3012), and an anode of the fourth diode D15 is coupled to the third positive connection terminal 001 (that is, the anode of the fourth diode D15 is coupled to the negative output terminal of the second photovoltaic substring 3012).

The fourth diode D16 is connected in parallel between the third negative connection terminal 002 and the connection terminal 004 in reverse directions. A cathode of the fourth diode D16 may be coupled to the third negative connection terminal 002 (that is, the cathode of the fourth diode D16 is coupled to the positive output terminal of the second photovoltaic substring 3013), and an anode of the fourth diode D16 is coupled to the connection terminal 004 (that is, the anode of the fourth diode D16 is coupled to the negative output terminal of the second photovoltaic substring 3013).

It may be understood that internal block diagrams of the power converter box in FIG. 19A and FIG. 18 may be understood as the same. However, relative positions of the third group of connection terminals and the fourth group of connection terminals of the power converter box are different because relative positions of the photovoltaic substrings corresponding to the power converter box are different.

Figure 19B:
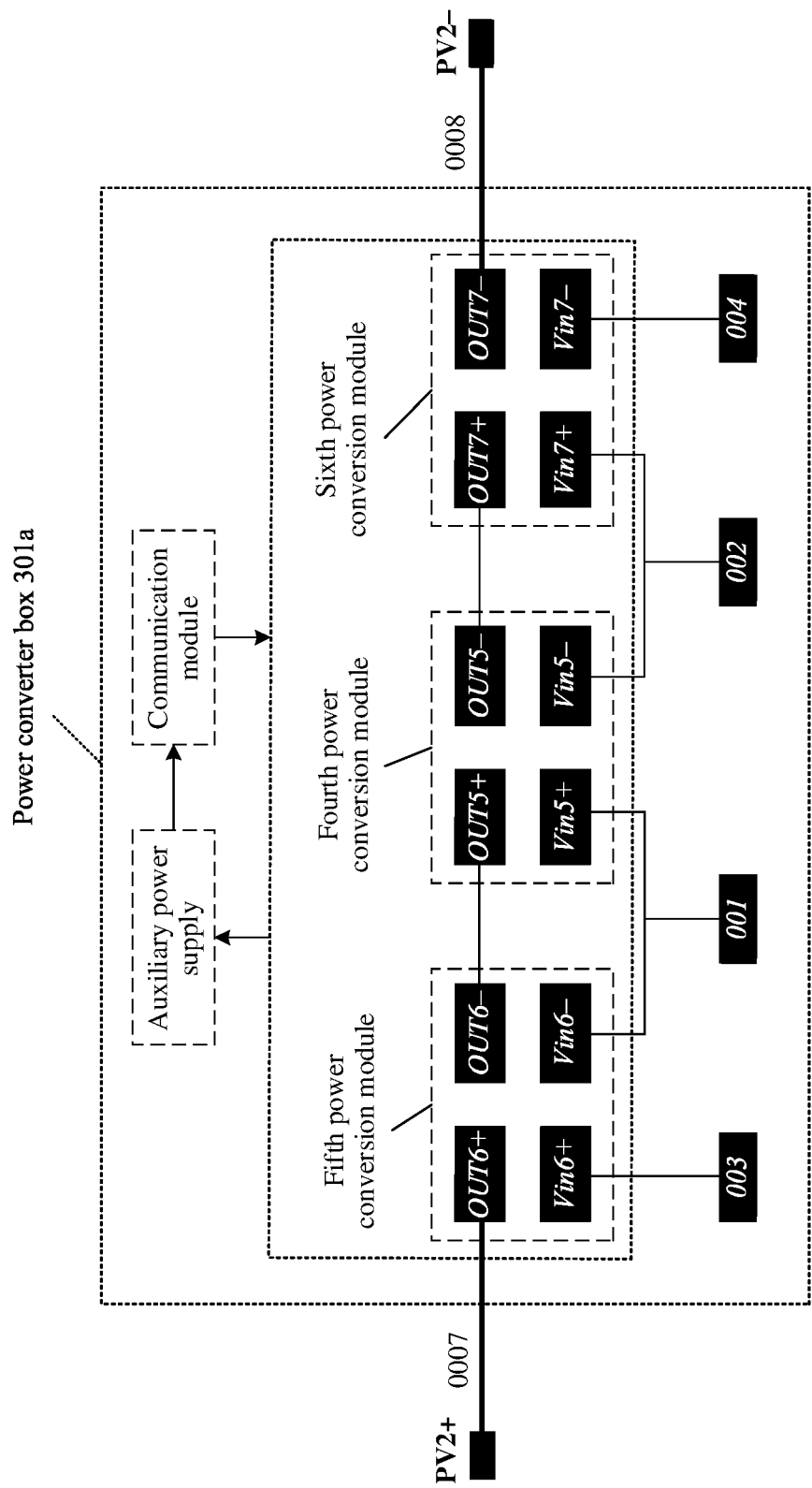

In some feasible implementations, for a part of block diagram of an internal structure of the power converter box 301*a* shown in FIG. 15, refer to FIG. 19B. As shown in FIG. 19B, the power converter box 301*a* includes at least one power conversion module, where the at least one power conversion module includes a plurality of power conversion modules (for example, a fourth power conversion module, a fifth power conversion module, and a sixth power conversion module) corresponding to a plurality of photovoltaic substring groups, and the plurality of power conversion modules each have one group of input terminals and one group of output terminals.

Each photovoltaic substring group includes any one or more of the photovoltaic substrings in the photovoltaic module 301. It should be noted that, in FIG. 19B, that each photovoltaic substring group includes one photovoltaic substring in the photovoltaic module is used as an example. It should be understood that a quantity of photovoltaic substrings included in the photovoltaic substring group is not limited, and photovoltaic substrings with a same output voltage may be used as a photovoltaic substring group to share a power conversion module to implement MPPT.

Input terminals of each power conversion module are respectively coupled to output terminals of a corresponding photovoltaic substring group, to process a power output by each photovoltaic substring group to obtain the second power.

For example, the fourth power conversion module corresponds to a first photovoltaic substring group (namely, the first photovoltaic substring 3011). The positive output terminal of the first photovoltaic substring 3011 is coupled to the third positive connection terminal 001 of the power converter box 301*a*, where the third positive connection terminal 001 and a positive input terminal Vin5+ of the fourth power conversion module can be coupled through a circuit board cable, that is, the positive output terminal of the first photovoltaic substring 3011 is coupled to the positive input terminal Vin5+ of the fourth power conversion module. The negative output terminal of the first photovoltaic substring 3011 is coupled to the third negative connection terminal 002 of the power converter box 301*a*, where the third negative connection terminal 002 and a negative input terminal Vin5− of the fourth power conversion module can be coupled through a circuit board cable, that is, the negative output terminal of the first photovoltaic substring 3011 is coupled to the negative input terminal Vin5− of the fourth power conversion module. In this case, the fourth power conversion module can perform MPPT on the first photovoltaic substring 3011.

The fifth power conversion module corresponds to a second photovoltaic substring group (namely, the second photovoltaic substring 3012). The positive output terminal of the second photovoltaic substring 3012 is coupled to the connection terminal 003 of the power converter box 301*a*, where the connection terminal 003 and a positive input terminal Vin6+ of the fifth power conversion module can be coupled through a circuit board cable, that is, the positive output terminal of the second photovoltaic substring 3012 is coupled to the positive input terminal Vin6+ of the fifth power conversion module. The negative output terminal of the second photovoltaic substring 3012 is coupled to the third positive connection terminal 001 of the power converter box 301*a*, where the third positive connection terminal 001 and a negative input terminal Vin6− of the fifth power conversion module are coupled, that is, the negative output terminal of the second photovoltaic substring 3012 is coupled to the negative input terminal Vin6− of the fifth power conversion module. In this case, the fifth power conversion module can perform MPPT on the second photovoltaic substring 3012.

The sixth power conversion module corresponds to a third photovoltaic substring group (namely, the third photovoltaic substring 3013). The positive output terminal of the first photovoltaic substring 3013 is coupled to the third negative connection terminal 002 of the power converter box 301*a*, where the third negative connection terminal 002 and a positive input terminal Vin7+ of the sixth power conversion module can be coupled through a circuit board cable, that is, the positive output terminal of the first photovoltaic substring 3013 is coupled to the positive input terminal Vin7+ of the sixth power conversion module. The negative output terminal of the first photovoltaic substring 3013 is coupled to the connection terminal 004 of the power converter box 301*a*, where the connection terminal 004 and a negative input terminal Vin7− of the sixth power conversion module are coupled, that is, the negative output terminal of the first photovoltaic substring 3013 is coupled to the negative input terminal Vin7− of the sixth power conversion module. In this case, the sixth power conversion module can perform MPPT on the first photovoltaic substring 3013.

A negative output terminal OUT6− of the fifth power conversion module is coupled to a positive output terminal OUT5+ of the fourth power conversion module; and a negative output terminal OUT5− of the fourth power conversion module is coupled to a positive output terminal OUT7+ of the sixth power conversion module. In this case, output terminals of the power conversion modules are coupled in series, and two terminals obtained after the output terminals of the power conversion modules are coupled in series are respectively a positive output terminal OUT6+ of the fifth power conversion module and a negative output terminal OUT7− of the sixth power conversion module. The positive output terminal OUT6+ of the fifth power conversion module (namely, the positive output terminal PV2+ of the photovoltaic module 301) is coupled to the positive input terminal of the inverter 31, and the negative output terminal OUT7− of the sixth power conversion module (namely, the negative output terminal PV2− of the photovoltaic module 301) is coupled to the negative input terminal of the inverter 31.

In this embodiment, a power conversion module corresponding to each photovoltaic substring may be disposed to implement substring-level MPPT, and a difference between this embodiment and FIG. 19A lies in that the power conversion modules are used to make output voltages of the photovoltaic substrings connected in series the same. This can prevent some photovoltaic substrings from becoming loads of another photovoltaic substring and being damaged by severe heat emitting because the photovoltaic substrings have insufficient output voltages due to problems such as shielding. In other words, the security of the use of the photovoltaic module can be also improved.

In conclusion, the photovoltaic module in embodiments may be in a product form that integrates a power converter box or a power converter box and a junction box. For example, in embodiments, a quantity of photovoltaic substrings included in the photovoltaic module may be N, where N is a positive integer. Therefore, the photovoltaic module in embodiments may be in a product form that integrates a power converter box, a power converter box and N−1 junction boxes, or the like. In embodiments, the quantity of photovoltaic substrings included in the photovoltaic module is not limited.

It may be understood that terminals such as a connection terminal and an input terminal may be pads on a PCB board, and terminals with a connection relationship may be combined, or one terminal may be split into several terminals with a connection relationship.

A solder ribbon may be a tin-plated copper ribbon or a tin-coated copper ribbon and may be applied to a connection of the photovoltaic module.

It should be noted that the terms "first" and "second" are merely intended for a purpose of description and shall not be understood as an indication or implication of relative importance.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

The foregoing descriptions are merely implementations but are not intended to limit the scope of the embodiments. Any variation or replacement readily figured out by a person skilled in the art shall be subject to the scope of the embodiments.

What is claimed is:

1. A photovoltaic module applicable to a photovoltaic system and coupled to an inverter in the photovoltaic system that comprises:
   at least two photovoltaic substrings comprising a first photovoltaic substring and at least one second photovoltaic substring;
   at least one power converter box comprising:
      at least one power conversion module further comprising one group of input terminals and one group of output terminals and
      a first group of connection terminals; and
   at least one junction box, comprising a second group of connection terminals, wherein
   the first group of connection terminals of the power converter box is coupled to output terminals of the first photovoltaic substring, and the second group of connection terminals of the junction box is coupled to output terminals of the second photovoltaic substring; the first group of connection terminals of the power converter box and the second group of connection terminals of the junction box are coupled through a solder ribbon, to enable the output terminals of the first photovoltaic substring and the output terminals of the second photovoltaic substring to be coupled in series; and
   when a port obtained after the output terminals of the first photovoltaic substring and the output terminals of the second photovoltaic substring are coupled in series is coupled to a first target connection terminal of the power converter box, the first target connection terminal of the power converter box is coupled to an input terminal of the power conversion module through a circuit board cable, wherein the first target connection terminal is any terminal of the first group of connection terminals of the power converter box; or
   when a port obtained after the output terminals of the first photovoltaic substring and the output terminals of the second photovoltaic substring are coupled in series is coupled to a second target connection terminal of the junction box, the second target connection terminal of the junction box is coupled to an input terminal of the power conversion module through a first cable, wherein the second target connection terminal is any one or two terminals of the second group of connection terminals of the junction box; and
   the input terminals of the power conversion module are configured to receive a first power output after the output terminals of the first photovoltaic substring and the output terminals of the second photovoltaic substring are coupled in series; and
   output terminals of the power conversion module are coupled to an inverter through a second cable, to transmit a second power processed by the power conversion module to the inverter.

2. The photovoltaic module according to claim 1, wherein the power converter box further comprises:
   a first diode corresponding to the first photovoltaic substring; and
   at least one second diode corresponding to the at least one second photovoltaic substring, wherein the output terminals of the first photovoltaic substring and the output terminals of the second photovoltaic substring each comprise a positive output terminal and a negative output terminal; the positive output terminal of the first photovoltaic substring is coupled to a cathode of the first diode, and the negative output terminal of the first photovoltaic substring is coupled to an anode of the first diode; and the positive output terminal of the second photovoltaic substring is coupled to a cathode of the second diode, and the negative output terminal of the second photovoltaic substring is coupled to an anode of the second diode.

3. The photovoltaic module according to claim 1, wherein the power converter box further comprises a first diode, and the junction box further comprises a second diode, the output terminals of the first photovoltaic substring and the output terminals of the second photovoltaic substring each comprise a positive output terminal and a negative output terminal; the positive output terminal of the first photovoltaic substring is coupled to a cathode of the first diode, and the negative output terminal of the first photovoltaic substring is coupled to an anode of the first diode; and the positive output terminal of the second photovoltaic substring is coupled to a cathode of the second diode, and the negative output terminal of the second photovoltaic substring is coupled to an anode of the second diode.

4. The photovoltaic module according to claim 1, wherein the at least one power conversion module comprises a plurality of power conversion modules corresponding to a plurality of photovoltaic substring groups; each photovoltaic substring group comprises any one or more of the photovoltaic substrings in the photovoltaic module; input terminals of each power conversion module are respectively coupled to output terminals of a photovoltaic substring group corresponding to the power conversion module, to process a power output by each photovoltaic substring group to obtain the second power; and output terminals of each power conversion module are coupled in series to the inverter.

5. The photovoltaic module according to claim 1, wherein each photovoltaic substring comprises two substring units connected in parallel; and
   a parallel point between the two substring units connected in parallel is an output terminal of the photovoltaic substring in which the two substring units connected in parallel are located.

6. The photovoltaic module according to claim 1, wherein the at least one junction box further comprises:
   a first junction box; and
   a second junction box, the second group of connection terminals of each junction box comprises:
   a second positive connection terminal; and
   a second negative connection terminal; the first group of connection terminals of the power converter box comprises:
   a first positive connection terminal; and a first negative connection terminal; the group of input terminals of the power conversion module comprises:
a positive input terminal; and
a negative input terminal; the solder ribbon comprises:
a first solder ribbon; and
a second solder ribbon; and the first cable comprises:
a first sub cable; and
a second sub cable; and
the second negative connection terminal of the first junction box is coupled to the first positive connection terminal of the power converter box through the first solder ribbon, and the first negative connection terminal of the power converter box is coupled to the second positive connection terminal of the second junction box through the second solder ribbon; and the second positive output terminal of the first junction box is coupled to the positive input terminal of the power conversion module through the first sub cable, and the second negative output terminal of the second junction box is coupled to the negative input terminal of the power conversion module through the second sub cable.

\* \* \* \* \*